US012041456B2

United States Patent
Yu et al.

(10) Patent No.: US 12,041,456 B2
(45) Date of Patent: *Jul. 16, 2024

(54) PROFILE MANAGEMENT METHOD, EMBEDDED UNIVERSAL INTEGRATED CIRCUIT CARD, AND TERMINAL

(71) Applicant: Huawei Technologies Co., Ltd., Shenzhen (CN)

(72) Inventors: Xiaobo Yu, Shenzhen (CN); Shunan Fan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,088

(22) Filed: Oct. 25, 2022

(65) Prior Publication Data

US 2023/0037497 A1 Feb. 9, 2023

Related U.S. Application Data

(63) Continuation of application No. 16/954,971, filed as application No. PCT/CN2017/117172 on Dec. 19, 2017, now Pat. No. 11,516,672.

(51) Int. Cl.
*H04W 12/37* (2021.01)
*H04W 8/22* (2009.01)

(52) U.S. Cl.
CPC .............. *H04W 12/37* (2021.01); *H04W 8/22* (2013.01)

(58) Field of Classification Search
CPC .................................. H04W 12/37; H04W 8/22
See application file for complete search history.

(56) References Cited

U.S. PATENT DOCUMENTS 9,021,548 B2 * 4/2015 Holtmanns ............. G06F 21/00
726/1
9,301,145 B2 * 3/2016 Merrien ............... H04B 1/3816
(Continued)

FOREIGN PATENT DOCUMENTS

CN 106538042 A 3/2017
CN 106664521 A 5/2017
(Continued)

OTHER PUBLICATIONS

RSP Architecture Version 1.0 GSM Association Official Document SGP.21—RSP Architecture, Dec. 23, 2015, 52 pages.
(Continued)

*Primary Examiner* — Parth Patel
(74) *Attorney, Agent, or Firm* — Conley Rose, P.C.

(57) ABSTRACT

A local profile management method includes an embedded universal integrated circuit card (eUICC) and a terminal. The eUICC includes a primary platform and at least one installed bundle. The primary platform is a hardware platform. Each bundle includes at least one profile and an operating system (OS). The primary platform includes a processing module configured to receive a first message sent by a local profile assistant (LPA), where the first message is an operation instruction entered by a user, and separately send a second message to at least one OS corresponding to the at least one bundle, where the second message is used by the at least one OS to perform a corresponding operation. Local management of profiles of different OSs is implemented using the processing module disposed on the primary platform of the eUICC.

20 Claims, 20 Drawing Sheets

(56) References Cited

U.S. PATENT DOCUMENTS

| | | | |
|---|---|---|---|
| 9,706,407 B2* | 7/2017 | Seo | H04W 8/20 |
| 10,530,756 B1* | 1/2020 | Youngs | H04W 12/08 |
| 10,769,279 B2* | 9/2020 | Yang | G06F 21/572 |
| 10,776,683 B2* | 9/2020 | Yi | H04W 8/183 |
| 10,856,137 B2* | 12/2020 | Li | H04W 8/18 |
| 11,039,298 B2* | 6/2021 | Lee | H04L 63/20 |
| 11,340,885 B2* | 5/2022 | Zhang | G06F 9/4406 |
| 2003/0167373 A1* | 9/2003 | Winters | G06F 8/654 |
| | | | 711/104 |
| 2005/0209991 A1* | 9/2005 | Rogers | G06F 3/064 |
| 2008/0208715 A1* | 8/2008 | Hod | G06Q 30/06 |
| | | | 705/26.62 |
| 2011/0081950 A1* | 4/2011 | Guven | H04W 8/22 |
| | | | 455/558 |
| 2013/0305047 A1* | 11/2013 | Xi | H04W 12/082 |
| | | | 713/168 |
| 2014/0087790 A1* | 3/2014 | Babbage | H04W 8/183 |
| | | | 455/558 |
| 2014/0099925 A1* | 4/2014 | Schell | H04L 63/08 |
| | | | 455/411 |
| 2014/0219447 A1 | 8/2014 | Park et al. | |
| 2014/0329502 A1 | 11/2014 | Lee et al. | |
| 2015/0110035 A1* | 4/2015 | Lee | H04W 8/183 |
| | | | 370/329 |
| 2015/0193224 A1* | 7/2015 | Ziat | H04W 12/35 |
| | | | 717/172 |
| 2015/0230070 A1* | 8/2015 | Kadiyala | H04W 72/02 |
| | | | 455/552.1 |
| 2015/0282057 A1* | 10/2015 | Li | H04B 7/0871 |
| | | | 455/552.1 |
| 2015/0358757 A1* | 12/2015 | Ford | H04W 4/50 |
| | | | 455/418 |
| 2016/0020804 A1 | 1/2016 | Lee et al. | |
| 2016/0105540 A1* | 4/2016 | Kwon | H04N 21/4312 |
| | | | 715/744 |
| 2016/0149903 A1* | 5/2016 | Suh | H04L 63/0428 |
| | | | 713/156 |
| 2016/0246585 A1* | 8/2016 | Li | G06F 8/65 |
| 2016/0330175 A1* | 11/2016 | Li | G06F 8/65 |
| 2017/0064552 A1* | 3/2017 | Park | H04L 9/3273 |
| 2017/0149827 A1* | 5/2017 | Sims | H04L 63/20 |
| 2017/0188226 A1* | 6/2017 | Wu | H04W 8/186 |
| 2017/0366962 A1* | 12/2017 | Kim | H04W 8/18 |
| 2018/0041601 A1* | 2/2018 | Park | H04L 9/3271 |
| 2018/0084426 A1* | 3/2018 | Yang | H04L 63/0807 |
| 2018/0131699 A1* | 5/2018 | Park | H04L 63/0281 |
| 2018/0249322 A1* | 8/2018 | Kim | H04W 8/183 |
| 2018/0270363 A1* | 9/2018 | Guday | H04M 15/8083 |
| 2018/0288606 A1* | 10/2018 | Gao | H04W 8/183 |
| 2019/0069122 A1* | 2/2019 | Karimli | H04M 17/02 |
| 2019/0075453 A1* | 3/2019 | Yoon | H04W 8/245 |
| 2019/0181901 A1* | 6/2019 | Namiranian | H04L 63/08 |
| 2019/0182659 A1* | 6/2019 | Ahmed | H04W 8/245 |
| 2019/0253884 A1* | 8/2019 | Fan | H04W 8/183 |
| 2019/0364415 A1* | 11/2019 | Gao | H04W 8/20 |
| 2020/0178066 A1* | 6/2020 | Park | H04L 63/0823 |
| 2020/0228488 A1* | 7/2020 | Xu | H04W 8/205 |
| 2020/0314639 A1* | 10/2020 | Yu | G06F 21/77 |
| 2020/0389785 A1* | 12/2020 | Lee | H04W 12/35 |
| 2021/0011737 A1* | 1/2021 | Yu | H04L 67/303 |
| 2021/0112402 A1* | 4/2021 | Ullah | H04W 12/0471 |
| 2021/0144551 A1* | 5/2021 | Lee | H04L 65/40 |
| 2022/0086622 A1* | 3/2022 | Laina Farell | H04W 12/40 |
| 2022/0159448 A1* | 5/2022 | Kang | H04W 8/22 |

FOREIGN PATENT DOCUMENTS

| | | |
|---|---|---|
| CN | 106851621 A | 6/2017 |
| CN | 106937274 A | 7/2017 |
| EP | 3340668 A1 | 6/2018 |
| IN | 106648725 A | 5/2017 |
| WO | 2015076709 A1 | 5/2015 |
| WO | 2016167551 A1 | 10/2016 |
| WO | 2017041306 A1 | 3/2017 |
| WO | 2017054172 A1 | 4/2017 |
| WO | 2017147873 A1 | 9/2017 |

OTHER PUBLICATIONS

XP55404424 Rsp Architecture Version 2.0, GSM Association, Aug. 23, 2016, 94 pages.

* cited by examiner

PROFILE MANAGEMENT METHOD, EMBEDDED UNIVERSAL INTEGRATED CIRCUIT CARD, AND TERMINAL

CROSS-REFERENCE TO RELATED APPLICATIONS

This is a continuation of U.S. patent application Ser. No. 16/954,971 filed on Jun. 17, 2020, which is a National Stage of International Patent Application No. PCT/CN2017/117172 filed on Dec. 19, 2017, both of which are hereby incorporated by reference in their entirety.

TECHNICAL FIELD

This application relates to the eUICC management field, and in particular, to a method for managing a profile, an embedded universal integrated circuit card eUICC, and a terminal.

BACKGROUND

An embedded universal integrated circuit card (eUICC) is a third-generation telecommunications smart card, and the term eUICC is derived from an embedded (embedded) UICC. The eUICC may be embedded in a terminal device in a form of a single chip, or may be disposed in a terminal device as a part of another single chip. However, this does not mean that the eUICC has to be embedded in the device and is immovable. The eUICC may be in a form of a movable card, such as a subscriber identification module (SIM) card, a MicroSIM card, or a NanoSIM card. In actual application, after downloading and installing a profile provided by an operator, the eUICC can enable the profile and further access the operator's network (for example, a 2G/3G/4G network).

The eUICC can use a remote SIM provisioning (RSP) server to manage a local profile, such as profile enabling, disabling, or deletion triggered by a user of a device. However, in the prior art, profile management in the RSP server is usually managing profiles installed in the same chip operating system (COS). Consequently, this method cannot be applied to a scenario in which there are a plurality of profiles in a plurality of COSs, where the COS may be referred to as an operating system (OS).

SUMMARY

The present subject matter provides a method for managing a profile, an embedded universal integrated circuit card (eUICC), and a terminal, to resolve a problem that an existing RSP server cannot perform local profile management in a multi-OS multi-profile scenario.

According to a first aspect, an embedded universal integrated circuit card (eUICC) is provided. The eUICC includes a primary platform and at least one installed bundle, the primary platform is a hardware platform, each bundle includes at least one profile and an operating system (OS), the primary platform includes a processing module, and the processing module is configured to: receive a first message sent by a local profile assistant (LPA), where the first message is an operation instruction entered by a user; and separately send a second message to at least one OS corresponding to the at least one bundle, where the second message is used by the at least one OS to perform a corresponding operation.

A processing module disposed on the primary platform of the eUICC manages profiles of different OSs. Alternatively, a processing module such as an ISD-R may not be added to the primary platform, and the primary platform performs an operation similar to that of the ISD-R.

With reference to the first aspect, in a first possible implementation of the first aspect, the first message is a profile enabling command, the first message includes an integrated circuit card identifier (ICCID), and the ICCID is used to identify a profile; and the second message is a profile policy rule obtaining message.

With reference to the first aspect or the first possible implementation of the first aspect, in a second possible implementation of the first aspect, the separately sending a second message to at least one OS corresponding to the at least one bundle includes: sending the second message to an OS in which an enabled profile is located, where the at least one OS includes the OS in which the enabled profile is located; receiving a profile policy rule, sent by the OS, of the enabled profile; executing the profile policy rule according to the profile policy rule and a rule authorization list RAT preset by the processing module; and sending an error message to the LPA when the profile rule does not allow disabling.

With reference to the first aspect, in a third possible implementation of the first aspect, the first message is an eUICC memory reset command, the first message includes first indication information, and the second message includes second indication information. The first indication information is used to instruct to delete an operational profile in the at least one OS from the eUICC, and the second indication information is used to instruct to delete the operational profile. Alternatively, the first indication information is used to instruct to delete a test profile in the at least one OS from the eUICC, and the second indication information is used to instruct to delete the test profile.

With reference to the first aspect or the third possible implementation of the first aspect, in a fourth possible implementation of the first aspect, the first message further includes third indication information, and the third indication information is used to instruct to delete the at least one OS. After separately sending the second message to the at least one OS corresponding to the at least one bundle, the processing module is further configured to: separately send a third message to the at least one OS, where the third message includes the third indication information.

With reference to the fourth possible implementation of the first aspect, in a fifth possible implementation of the first aspect, the deleting the at least one OS includes deleting at least one non-default OS or deleting at least one test OS.

With reference to the first aspect or any one of the foregoing possible implementations, in a sixth possible implementation of the first aspect, before the receiving, by an ISD-R, a first message sent by a local profile assistant LPA, the processing module is further configured to: update a profile list based on the at least one bundle downloaded and installed by the eUICC, where each bundle includes an OS in the at least one OS and at least one profile, and the profile list includes an identifier of the at least one OS and an ICCID corresponding to the at least one profile installed in the at least one OS.

With reference to the first aspect or any one of the foregoing possible implementations, in a seventh possible implementation of the first aspect, before the receiving a first message sent by a local profile assistant LPA, the processing module is further configured to: send ISD-R mode information to the LPA, where the ISD-R mode information is used to instruct the LPA to send the first message to the processing module when the LPA receives the operation instruction entered by the user.

In a possible implementation, the processing module is an issuer security domain-root ISD-R.

According to a second aspect, an embedded universal integrated circuit card (eUICC) is provided. The eUICC includes a local profile assistant (LPA), and the LPA is configured to: receive an operation instruction entered by a user for enabling a first profile; and determine that the first profile is installed in a first operating system (OS); execute a currently operational profile policy rule (PPR) of an enabled second profile; and when the PPR does not allow disabling, display, by the LPA, information that the first profile cannot be enabled, where the second profile is installed in a second OS.

The LPA implements management of profiles across OSs.

In a possible implementation, before the receiving an operation instruction entered by a user for enabling a first profile, the LPA eUICC is further configured to: update a profile list based on a first bundle downloaded and installed by the embedded universal integrated circuit card (eUICC), where the first bundle includes the first OS and the first profile, and the profile list includes an identifier of at least one OS installed in the eUICC and an integrated circuit card identifier (ICCID) corresponding to a profile installed in the at least one OS.

In another possible implementation, before the receiving an operation instruction entered by a user for enabling a first profile, the LPA eUICC is further configured to: update the profile list based on a second installation bundle downloaded and installed by the embedded universal integrated circuit card (eUICC), where the second bundle includes the second OS and the second profile, and the profile list includes the second OS and an integrated circuit card identifier (ICCID) corresponding to the second profile installed in the second OS; when the LPA receives an operation instruction entered by the user for enabling the second profile, send, by the LPA, a command for enabling the second profile to the second OS, where the command for enabling the profile includes the ICCID corresponding to the second profile; and receive a PPR, sent by the second OS, of the second profile.

According to a third aspect, an embedded universal integrated circuit card (eUICC) is provided. The eUICC includes a local profile assistant (LPA), a primary platform, and an installed bundle, the primary platform is a hardware platform, the bundle includes a profile and a first operating system (OS), the primary platform includes a processing module, and the LPA is configured to: receive an operation instruction entered by a user, where the operation instruction is used to enable or delete a profile; determine that the profile is installed in the first operating system (OS) and that the first OS is not enabled; and send a first message to the processing module, where the first message is used by the processing module to execute the operation instruction, and the first message includes an identifier of the first OS and an integrated circuit card identifier (ICCID) corresponding to the profile.

In a possible implementation, before the receiving an operation instruction entered by a user, the LPA is further configured to: receive ISD-R mode information sent by the processing module, where the ISD-R mode information is used to instruct the LPA to send the first message to the processing module when the LPA receives the operation instruction entered by the user.

According to a fourth aspect, an embedded universal integrated circuit card (eUICC) is provided. The eUICC includes a primary platform and a bundle, the primary platform is a hardware platform, the bundle includes a profile and a first operating system (OS), the primary platform includes a processing module, and the processing module is configured to: receive a first message sent by a local profile assistant (LPA), where the first message includes an identifier of the first operating system OS and an integrated circuit card identifier (ICCID) corresponding to the profile, and the profile is installed in the first OS; send a second message to an OS corresponding to the identifier of the first OS, where the second message includes a command for enabling the first OS; and after the processing module receives feedback information sent by the first OS, send a third message to the first OS, where the third message includes the ICCID corresponding to the profile.

The first message and the third message are used to enable or delete the profile.

In a possible implementation, before the receiving a first message sent by a local profile assistant (LPA), the processing module is further configured to: update a profile list based on a bundle downloaded and installed by the eUICC, where the bundle includes the first OS and the profile.

In a possible implementation, the processing module is further configured to: send ISD-R mode information to the LPA, where the ISD-R mode information is used to instruct the LPA to send the first message to the processing module when the LPA receives an operation instruction entered by a user.

In a possible implementation, the processing module is an issuer security domain-root ISD-R.

According to a fifth aspect, an embedded universal integrated circuit card (eUICC) is provided. The eUICC includes a primary platform and at least one installed bundle, the primary platform is a hardware platform, each bundle includes at least one profile and an operating system (OS), the primary platform includes a processing module, and the processing module is configured to: receive a first message sent by a local profile assistant (LPA), where the first message includes first indication information, and the first indication information is used to instruct to obtain all profile information in the at least one OS corresponding to the at least one bundle installed in the eUICC; send a second message to the at least one OS, where the second message includes second indication information, and the second indication information is used to instruct to obtain the profile information; receive at least one third message sent by the at least one OS, where the third message includes profile list information; and send a fourth message to the LPA, where the fourth message includes the profile list information sent by the at least one OS.

An ISD-R provided on the primary platform of the eUICC obtains information about profiles of different OSs.

In a possible implementation, before the receiving a first message sent by a local profile assistant (LPA), the processing module is further configured to: update a profile list based on a bundle downloaded and installed by the eUICC, where the bundle includes the at least one OS and a profile installed in the at least one OS, and the profile list includes an identifier of the at least one OS and an integrated circuit card identifier (ICCID) corresponding to the profile installed in the at least one OS.

In a possible implementation, before the receiving a first message sent by a local profile assistant (LPA), the processing module is further configured to: send ISD-R mode information to the LPA, where the ISD-R mode information is used to instruct the LPA to send the first message to the ISD-R when the LPA receives the operation instruction entered by the user.

In a possible implementation, the processing module is an issuer security domain-root (ISD-R).

According to a sixth aspect, a method for managing a local profile is provided. An embedded universal integrated circuit card (eUICC) includes a primary platform, the primary platform is a hardware platform, the primary platform includes a processing module, and the method includes: receiving, by the processing module, a first message sent by a local profile assistant (LPA), where the first message is an operation instruction entered by a user; and separately sending, by the processing module, a second message to at least one operating system (OS) installed in the eUICC, where the second message is used to instruct the at least one OS to perform a corresponding operation.

The processing module disposed on the primary platform of the eUICC manages profiles of different OSs. Alternatively, the processing module may not be added to the primary platform.

With reference to the sixth aspect, in a first possible implementation of the sixth aspect, the first message is a profile enabling command, the first message includes an integrated circuit card identifier (ICCID), and the ICCID is used to identify a profile; and the second message is a profile policy rule obtaining message.

The processing module disposed on the primary platform of the eUICC enables profile across OSs.

With reference to the sixth aspect or the first possible implementation of the sixth aspect, in a second possible implementation of the sixth aspect, the separately sending, by the processing module, a second message to at least one operating system (OS) installed in the eUICC includes: sending, by the processing module, the second message to an OS in which the enabled profile is located, where the at least one OS includes the OS in which the enabled profile is located; receiving, by the processing module, a profile policy rule, sent by the OS, of the enabled profile; executing, by the processing module, the profile policy rule according to the profile policy rule and a rule authorization list (RAT) preset by the processing module; and when the profile rule does not allow disabling, sending, by the processing module, an error message to the LPA.

With reference to the sixth aspect, in a third possible implementation of the sixth aspect, the first message is an eUICC memory reset command, the first message includes first indication information, and the second message includes second indication information. The first indication information is used to instruct to delete an operational profile in the at least one OS from the eUICC, and the second indication information is used to instruct to delete the operational profile. Alternatively, the first indication information is used to instruct to delete a test profile in the at least one OS from the eUICC, and the second indication information is used to instruct to delete the test profile.

With reference to the sixth aspect or the third possible implementation of the sixth aspect, in a fourth possible implementation of the sixth aspect, the first message further includes third indication information, and the third indication information is used to instruct to delete the at least one OS. After the separately sending, by the processing module, a second message to at least one operating system OS installed in the eUICC, the method further includes: separately sending, by the processing module, a third message to the at least one OS, where the third message includes the third indication information.

With reference to the fourth possible implementation of the sixth aspect, in a fifth possible implementation of the sixth aspect, the deleting the at least one OS includes deleting at least one non-default OS or deleting at least one test OS.

With reference to the sixth aspect or any one of the foregoing possible implementations, in a sixth possible implementation of the sixth aspect, before the receiving, by the processing module, a first message sent by a local profile assistant (LPA), the method further includes: updating, by the processing module, a profile list based on the at least one bundle downloaded and installed by the eUICC, where each bundle includes an OS in the at least one OS and at least one profile, and the profile list includes an identifier of the at least one OS and an ICCID corresponding to the at least one profile installed in the at least one OS.

With reference to the sixth aspect or any one of the foregoing possible implementations, in a seventh possible implementation of the sixth aspect, before the receiving, by the processing module, a first message sent by a local profile assistant (LPA), the method further includes: sending, by the processing module, ISD-R mode (mode) information to the LPA, where the ISD-R mode information is used to instruct the LPA to send the first message to an ISD-R when the LPA receives the operation instruction entered by the user.

In a possible implementation, the processing module may be an issuer security domain-root (ISD-R).

According to a seventh aspect, a method for managing a local profile is provided. The method may include: receiving, by a local profile assistant (LPA), an operation instruction entered by a user for enabling a first profile; and determining, by the LPA, that the first profile is installed in a first operating system (OS), executing a currently operational profile policy rule (PPR) of an enabled second profile, and when the PPR does not allow disabling, displaying, by the LPA, information indicating that the first profile cannot be enabled.

The LPA manages profiles across OSs.

In a possible implementation, before the receiving, by a local profile assistant (LPA), an operation instruction entered by a user for enabling a first profile, the method further includes: updating, by the LPA, a profile list based on a first bundle downloaded and installed by an embedded universal integrated circuit card (eUICC), where the first bundle includes a first OS and the first profile, and the profile list includes an identifier of at least one OS installed in the eUICC and an integrated circuit card identifier (ICCID) corresponding to a profile installed in the at least one OS.

In another possible implementation, before the receiving, by a local profile assistant (LPA), an operation instruction entered by a user for enabling a first profile, the method further includes: updating, by the LPA, a profile list based on a second installation bundle downloaded and installed by the embedded universal integrated circuit card (eUICC), where the second bundle includes the second OS and the second profile, and the profile list includes the second OS and an integrated circuit card identifier (ICCID) corresponding to the second profile installed in the second OS; when the LPA receives an operation instruction entered by the user for enabling the second profile, sending, by the LPA, a command for enabling the second profile to the second OS, where the command for enabling the profile includes the ICCID corresponding to the second profile; and receiving, by the LPA, the PPR, sent by the second OS, of the second profile.

According to an eighth aspect, a method for managing a local profile is provided. An embedded universal integrated circuit card (eUICC) includes a primary platform, the primary platform is a hardware platform, the primary platform includes a processing module, and the method may include: receiving, by a local profile assistant (LPA), an operation instruction entered by a user, where the operation instruction is used to enable or delete a profile; determining, by the LPA, that the profile is installed in a first operating system (OS) and that the first OS is not enabled; and sending, by the LPA, a first message to the processing module, where the first message is used by the processing module to execute the operation instruction, and the first message includes an identifier of the first OS and an integrated circuit card identifier (ICCID) corresponding to the profile.

In a possible implementation, the processing module may be an issuer security domain-root ISD-R.

The ISD-R provided on the primary platform of the eUICC manages profiles of different OSs.

In a possible implementation, before the receiving, by a local profile assistant (LPA), an operation instruction entered by a user, the method further includes: receiving, by the LPA, ISD-R mode information sent by the processing module, where the ISD-R mode information is used to instruct the LPA to send the first message to the processing module when the LPA receives the operation instruction entered by the user.

According to a ninth aspect, a method for managing a local profile is provided. An embedded universal integrated circuit card (eUICC) includes a primary platform, the primary platform is a hardware platform, the primary platform includes a processing module, and the method may include: receiving, by a processing module, a first message sent by a local profile assistant (LPA), where the first message includes an identifier of a first operating system (OS) and an integrated circuit card identifier (ICCID) corresponding to a profile, and the profile is installed in the first OS; sending, by the processing module, a second message to an OS corresponding to the identifier of the first OS, where the second message includes a command for enabling the first OS; and sending, by the processing module, a third message to the first OS after receiving feedback information sent by the first OS, where the third message includes the ICCID corresponding to the profile.

The first message and the third message are used to enable or delete the profile.

In a possible implementation, the processing module may be an issuer security domain-root ISD-R.

An ISD-R provided on the primary platform of the eUICC enables or deletes profiles of different OSs.

In a possible implementation, before receiving, by the ISD-R, a first message sent by a local profile assistant (LPA), the method further includes: updating, by the processing module, a profile list based on a bundle downloaded and installed by the eUICC, where the bundle includes the first OS and the profile.

In a possible implementation, the method further includes: sending, by the processing module, ISD-R mode information to the LPA, where the ISD-R mode information is used to instruct the LPA to send the first message to the processing module when the LPA receives an operation instruction entered by a user.

According to a tenth aspect, a method for managing a local profile is provided. An embedded universal integrated circuit card (eUICC) includes a primary platform, the primary platform is a hardware platform, the primary platform includes a processing module, and the method may include: receiving, by the processing module, a first message sent by a local profile assistant LPA, where the first message includes first indication information, and the first indication information is used to instruct to obtain all profile information in at least one operating system (OS) installed in the eUICC; sending, by the processing module, a second message to the at least one OS, where the second message includes second indication information, and the second indication information is used to instruct to obtain the profile information; receiving, by the processing module, at least one third message sent by the at least one OS, where the third message includes profile list information; and sending, by the processing module, a fourth message to the LPA, where the fourth message includes the profile list information sent by the at least one OS.

In a possible implementation, the processing module may be an issuer security domain-root ISD-R.

The ISD-R provided on the primary platform of the eUICC obtains information about profiles of different OSs.

In a possible implementation, before the receiving, by the processing module, a first message sent by a local profile assistant (LPA), the method further includes: updating, by the processing module, a profile list based on a bundle downloaded and installed by the eUICC, where the bundle includes the at least one OS and a profile installed in the at least one OS, and the profile list includes an identifier of the at least one OS and an integrated circuit card identifier (ICCID) corresponding to the profile installed in the at least one OS.

In a possible implementation, before the receiving, by the processing module, a first message sent by a local profile assistant (LPA), the method further includes: sending, by the processing module, ISD-R mode information to the LPA, where the ISD-R mode information is used to instruct the LPA to send the first message to the processing module when the LPA receives an operation instruction entered by a user.

According to an eleventh aspect, an embedded universal integrated circuit card (eUICC) is provided, where a primary platform of the eUICC includes a processing module, the primary platform is a hardware platform, and the processing module includes: a receiving unit, configured to receive a first message sent by an LPA, where the first message is an operation instruction entered by a user; a sending unit, configured to separately send a second message to at least one operating system OS installed in the eUICC, where the second message is used to instruct the at least one OS to perform a corresponding operation.

An ISD-R provided on the primary platform of the eUICC manages profiles of different OSs.

With reference to the eleventh aspect, in a first possible implementation of the eleventh aspect, the first message is a profile enabling command, the first message includes an integrated circuit card identifier (ICCID), and the ICCID is used to identify a profile; and the second message is a profile policy rule obtaining message.

In a possible implementation, the processing module may be an issuer security domain-root ISD-R.

The ISD-R provided on the primary platform of the eUICC enables profiles across OSs.

With reference to the eleventh aspect or the first possible implementation of the sixth aspect, in a second possible implementation of the eleventh aspect, the processing module further includes a processing unit, and that the sending unit is configured to separately send a second message to at least one operating system (OS) installed in the eUICC includes: the sending unit sends the second message to an OS in which an enabled profile is located, where the at least one OS includes the OS in which the enabled profile is located; the receiving unit receives the profile policy rule, sent by the OS, of the enabled profile; the processing unit executes the profile policy rule according to the profile policy rule and a rule authorization list (RAT) preset by the processing module; and when the profile rule does not allow disabling, the sending unit sends an error message to the LPA.

With reference to the eleventh aspect, in a third possible implementation of the eleventh aspect, the first message is an eUICC memory reset command, the first message includes first indication information, and the second message includes second indication information. The first indication information is used to instruct to delete an operational profile in the at least one OS from the eUICC, and the second indication information is used to instruct to delete the operational profile. Alternatively, the first indication information is used to instruct to delete a test profile in the at least one OS from the eUICC, and the second indication information is used to instruct to delete the test profile.

With reference to the eleventh aspect or the third possible implementation of the eleventh aspect, in a fourth possible implementation of the eleventh aspect, the first message further includes third indication information, and the third indication information is used to instruct to delete the at least one OS; and the sending unit is further configured to separately send a third message to the at least one OS, where the third message includes the third indication information.

With reference to the fourth possible implementation of the eleventh aspect, in a fifth possible implementation of the eleventh aspect, the deleting the at least one OS includes deleting at least one non-default OS or deleting at least one test OS.

With reference to the eleventh aspect or any one of the foregoing possible implementations, in a sixth possible implementation of the eleventh aspect, the processing unit of the processing module updates a profile list based on at least one bundle downloaded and installed by the eUICC, where each bundle includes an OS in the at least one OS and at least one profile, and the profile list includes an identifier of the at least one OS and an ICCID corresponding to the at least one profile installed in the at least one OS.

With reference to the eleventh aspect or any one of the foregoing possible implementations, in a seventh possible implementation of the eleventh aspect, the sending unit is further configured to send ISD-R mode (mode) information to the LPA, where the ISD-R mode information is used to instruct the LPA to send the first message to the processing module when the LPA receives the operation instruction entered by the user.

According to a twelfth aspect, a terminal is provided. The terminal includes a local profile assistant (LPA), and the LPA includes: a receiving unit, configured to receive an operation instruction entered by a user for enabling a first profile; and a processing unit, configured to: determine that the first profile is installed in the first operating system OS, execute a currently operational profile policy rule (PPR) of an enabled second profile, and when the PPR does not allow disabling, the LPA displays information indicating that the first profile cannot be enabled. The LPA manages profiles across OSs.

In a possible implementation, the processing unit is further configured to update a profile list based on a first bundle downloaded and installed by an eUICC, where the first bundle includes a first OS and the first profile. The profile list includes an identifier of at least one OS installed in the eUICC and an integrated circuit card identifier (ICCID) corresponding to a profile installed in the at least one OS.

In another possible implementation, the LPA further includes a sending unit.

The processing unit is further configured to update the profile list based on a second installation bundle downloaded and installed by the embedded universal integrated circuit card (eUICC), where the second bundle includes a second OS and a second profile, and the profile list includes the second OS and an integrated circuit card identifier (ICCID) corresponding to the second profile installed in the second OS; when the receiving unit receives the operation instruction entered by the user for enabling the second profile, the sending unit sends a command for enabling the second profile to the second OS, where the command for enabling the profile includes the ICCID corresponding to the second profile; and the receiving unit receives the PPR, sent by the second OS, of the second profile.

According to a thirteenth aspect, a terminal is provided. The device includes a local profile assistant (LPA) and an embedded universal integrated circuit card (eUICC), a primary platform of the eUICC includes a processing module, the primary platform is a hardware platform, and the LPA includes: a receiving unit, configured to receive an operation instruction entered by a user, where the operation instruction is used to enable or delete a profile; a processing unit, configured to determine that the profile is installed in a first operating system OS and that the first OS is not enabled; and a sending unit, configured to send a first message to the processing module, where the first message is used by an ISD-R to execute the operation instruction, and the first message includes an identifier of the first OS and an integrated circuit card identifier (ICCID) corresponding to the profile.

In a possible implementation, the processing module is an issuer security domain-root ISD-R.

The ISD-R provided on the primary platform of the eUICC manages profiles of different OSs.

In a possible implementation, the receiving unit is further configured to receive ISD-R mode information sent by the processing module, where the ISD-R mode information is used to instruct the LPA to send the first message to the processing module when the LPA receives the operation instruction entered by the user.

According to a fourteenth aspect, an embedded universal integrated circuit card eUICC is provided. A primary platform of the eUICC includes a processing module, the primary platform is a hardware platform, and the processing module includes: a receiving unit, configured to receive a first message sent by an LPA, where the first message includes an identifier of a first operating system (OS) and an integrated circuit card identifier (ICCID) corresponding to a profile, and the profile is installed in the first OS; and a sending unit, configured to send a second message to an OS corresponding to the identifier of the first OS, where the second message includes a command for enabling the first OS.

After the receiving unit receives feedback information sent by the first OS, the processing module sends a third message to the first OS, where the third message includes the ICCID corresponding to the profile.

The first message and the third message are used to enable or delete the profile.

In a possible implementation, the processing module is an issuer security domain-root ISD-R.

The ISD-R provided on the primary platform of the eUICC enables or deletes profiles of different OSs.

In a possible implementation, the processing module further includes a processing unit, configured to update a profile list based on a bundle downloaded and installed by the eUICC, where the bundle includes the first OS and the profile.

In a possible implementation, the sending unit is further configured to send ISD-R mode information to the LPA, where the ISD-R mode information is used to instruct the LPA to send the first message to the processing module when the LPA receives an operation instruction entered by a user.

According to a fifteenth aspect, an embedded universal integrated circuit card (eUICC) is provided. A primary platform of the eUICC includes a processing module, the primary platform is a hardware platform, and the processing module includes: a receiving unit, configured to receive a first message sent by an LPA, where the first message includes first indication information, and the first indication information is used to instruct to obtain all profile information in at least one operating system (OS) installed in the eUICC; and a sending unit, configured to send a second message to the at least one OS, where the second message includes second indication information, and the second indication information is used to instruct to obtain the profile information.

The receiving unit is further configured to receive at least one third message sent by the at least one OS, and the third message includes profile list information; and the sending unit is further configured to send a fourth message to the LPA, where the fourth message includes the profile list information sent by the at least one OS.

In a possible implementation, the processing module is an issuer security domain-root ISD-R.

An ISD-R provided on the primary platform of the eUICC obtains information about profiles of different OSs.

In a possible implementation, the processing module further includes a processing unit, configured to update a profile list based on a bundle downloaded and installed by the eUICC, where the bundle includes the at least one OS and a profile installed in the at least one OS, and the profile list includes an identifier of the at least one OS and an integrated circuit card identifier (ICCID) corresponding to the profile installed in the at least one OS.

In a possible implementation, the sending unit is further configured to send ISD-R mode information to the LPA, where the ISD-R mode information is used to instruct the LPA to send the first message to the processing module when the LPA receives an operation instruction entered by a user.

According to a sixteenth aspect, an embedded universal integrated circuit card (eUICC) is provided. The eUICC includes a memory, a processor, and a computer program that is stored in the memory and that can be run on the processor. When executing the program, the processor performs the following steps: receiving a first message sent by a local profile assistant (LPA), where the first message is an operation instruction entered by a user; and separately sending a second message to at least one operating system (OS) installed in the eUICC, where the second message is used to instruct the at least one OS to perform a corresponding operation. In this way, profiles of different OSs are managed.

With reference to the sixteenth aspect, in a first possible implementation of the sixteenth aspect, the first message is a profile enabling command, the first message includes an integrated circuit card identifier (ICCID), and the ICCID is used to identify a profile. The second message is a profile policy rule obtaining message.

With reference to the sixteenth aspect or the first possible implementation of the sixteenth aspect, the separately sending a second message to at least one OS installed in the eUICC includes: sending the second message to an OS in which an enabled profile is located, where the at least one OS includes the OS in which the enabled profile is located; receiving a profile policy rule, sent by the OS, of the enabled profile; executing the profile policy rule according to the profile policy rule and a rule authorization list (RAT) preset by an ISD-R; and sending an error message to the LPA when the profile rule does not allow disabling.

With reference to the sixteenth aspect, in a third possible implementation of the sixteenth aspect, the first message is an eUICC memory reset command, the first message includes first indication information, and the second message includes second indication information. The first indication information is used to instruct to delete an operational profile in the at least one OS from the eUICC, and the second indication information is used to instruct to delete the operational profile. Alternatively, the first indication information is used to instruct to delete a test profile in the at least one OS from the eUICC, and the second indication information is used to instruct to delete the test profile.

With reference to the sixteenth aspect or the third possible implementation of the sixth aspect, in a fourth possible implementation of the sixteenth aspect, the first message further includes third indication information, and the third indication information is used to instruct to delete the at least one OS. After separately sending the second message to the at least one OS corresponding to at least one bundle, the processor is further configured to: separately send a third message to the at least one OS, where the third message includes the third indication information.

With reference to the fourth possible implementation of the sixteenth aspect, in a fifth possible implementation of the sixteenth aspect, the deleting the at least one OS includes deleting at least one non-default OS or deleting at least one test OS.

With reference to the sixteenth aspect or any one of the foregoing possible implementations, in a sixth possible implementation of the sixteenth aspect, before the ISD-R receives the first message sent by the local profile assistant (LPA), the processor is further configured to: update a profile list based on the at least one bundle downloaded and installed by the eUICC, where each bundle includes an OS in the at least one OS and at least one profile, and the profile list includes an identifier of the at least one OS and an ICCID corresponding to the at least one profile installed in the at least one OS.

With reference to the sixteenth aspect or any one of the foregoing possible implementations, in a seventh possible implementation of the sixteenth aspect, before the ISD-R receives the first message sent by the local profile assistant (LPA), the processor is further configured to: send ISD-R mode information to the LPA, where the ISD-R mode information is used to instruct the LPA to send the first message to the ISD-R when the LPA receives the operation instruction entered by the user.

According to a seventeenth aspect, a terminal is provided. The device includes a memory, a processor, and a computer program that is stored in the memory and that can be run on the processor. When executing the program, the processor performs the following steps: receiving an operation instruction entered by a user for enabling a first profile; determining that the first profile is installed in a first operating system (OS), executing a currently operational profile policy rule (PPR) of an enabled second profile, and when the PPR does not allow disabling, displaying, by an LPA, information indicating that the first profile cannot be enabled. In this way, profiles of different OSs are managed.

Optionally, in a possible implementation, before receiving the operation instruction entered by the user for enabling the first profile, the processor is further configured to: update a profile list based on a first bundle downloaded and installed by an embedded universal integrated circuit card (eUICC), where the first bundle includes the first OS and the first profile; and the profile list includes an identifier of at least one OS installed in the eUICC and an integrated circuit card identifier (ICCID) corresponding to a profile installed in the at least one OS.

Optionally, in a possible implementation, before receiving the operation instruction entered by the user for enabling the first profile, the processor is further configured to: update the profile list based on a second installation bundle downloaded and installed by the embedded universal integrated circuit card (eUICC), where the second bundle includes a second OS and the second profile, and the profile list includes the second OS and an integrated circuit card identifier ICCID corresponding to the second profile installed in the second OS; when the LPA receives an operation instruction entered by the user for enabling the second profile, send, by the LPA, a command for enabling the second profile to the second OS, where the command for enabling the profile includes the ICCID corresponding to the second profile; and receive the PPR, sent by the second OS, of the second profile.

According to an eighteenth aspect, a terminal is provided. The terminal includes a memory, a processor, and a computer program that is stored in the memory and that can be run on the processor. When executing the program, the processor performs the following steps: receiving an operation instruction entered by a user, where the operation instruction is used to enable or delete a profile; determining that the profile is installed in a first operating system (OS) and that the first OS is not enabled; and sending a first message to an ISD-R, where the first message is used by the ISD-R to execute the operation instruction, and the first message includes an identifier of the first OS and an integrated circuit card identifier (ICCID) corresponding to the profile. In this way, profiles of different OSs are managed.

Optionally, in a possible implementation, before receiving the operation instruction entered by the user, the processor is further configured to: receive ISD-R mode information sent by the ISD-R, where the ISD-R mode information is used to instruct an LPA to send the first message to the ISD-R when the LPA receives the operation instruction entered by the user.

According to a nineteenth aspect, an embedded universal integrated circuit card (eUICC) is provided. The eUICC includes a memory, a processor, and a computer program that is stored in the memory and that can be run on the processor. When executing the program, the processor performs the following steps: receiving a first message sent by a local profile assistant (LPA), where the first message includes an identifier of a first operating system (OS) and an integrated circuit card identifier (ICCID) corresponding to a profile, and the profile is installed in the first OS; sending, by an ISD-R, a second message to an OS corresponding to the identifier of the first OS, where the second message includes a command for enabling the first OS; and sending, by the ISD-R, a third message to the first OS after receiving feedback information sent by the first OS, where the third message includes the ICCID corresponding to the profile.

The first message and the third message are used to enable or delete the profile. In this way, profiles of different OSs are managed.

Optionally, in a possible implementation, before receiving the first message sent by the local profile assistant (LPA), the processor is further configured to: update a profile list based on a bundle downloaded and installed by the eUICC, where the bundle includes the first OS and the profile.

Optionally, in a possible implementation, the processor is further configured to: send ISD-R mode information to the LPA, where the ISD-R mode information is used to instruct the LPA to send the first message to the ISD-R when the LPA receives an operation instruction entered by a user.

According to a twentieth aspect, an embedded universal integrated circuit card (eUICC) is provided. The eUICC includes a memory, a processor, and a computer program that is stored in the memory and that can be run on the processor. When executing the program, the processor performs the following steps: receiving a first message sent by a local profile assistant (LPA), where the first message includes first indication information, and the first indication information is used to instruct to obtain all profile information in at least one operating system (OS) installed in the eUICC; sending, by an ISD-R, a second message to the at least one OS, where the second message includes second indication information, and the second indication information is used to instruct to obtain the profile information; receiving, by the ISD-R, at least one third message sent by the at least one OS, where the third message includes profile list information; and sending, by the ISD-R, a fourth message to the LPA, where the fourth message includes the profile list information sent by the at least one OS.

Optionally, in a possible implementation, before receiving the first message sent by the local profile assistant (LPA), the processor is further configured to: update a profile list based on a bundle downloaded and installed by the eUICC, where the bundle includes the at least one OS and a profile installed in the at least one OS, and the profile list includes an identifier of the at least one OS and an integrated circuit card identifier (ICCID) corresponding to the profile installed in the at least one OS.

Optionally, in a possible implementation, before receiving the first message sent by the local profile assistant (LPA), the processor is further configured to: send ISD-R mode information to the LPA, where the ISD-R mode information is used to instruct the LPA to send the first message to the ISD-R when the LPA receives an operation instruction entered by a user.

In the sixteenth aspect, the eighteenth aspect, the nineteenth aspect, and the twentieth aspect, the ISD-R may also be referred to as another name, for example, a processing module.

According to a twenty-first aspect, a computer readable storage medium is provided, including an instruction. When the instruction is run on a device, the device is enabled to perform the method according to any one of the sixth aspect to the tenth aspect, or any one of the possible implementations of the sixth aspect to the possible implementations of the tenth aspect.

According to a twenty-second aspect, a computer program product including an instruction is provided. When the instruction is run on a computer, the computer is enabled to perform the method according to any one of the possible implementations of the sixth aspect to the possible implementations the tenth aspect.

Based on the provided method for managing a profile, embedded universal integrated circuit card (eUICC), and terminal, a plurality of operating systems and a plurality of profiles are locally managed by using the LPA of the terminal or by providing an ISD-R in an eUICC in the prior art on a PP.

DESCRIPTION OF EMBODIMENTS

In the embodiments of the present subject matter, an eUICC may be an Integrated Universal Integrated Circuit Card (IUICC). The eUICC and the IUICC are in two different forms. The eUICC may be an independent chip, can be installed on a terminal in a pluggable or unpluggable form, and is connected to a modem (modem) through an interface. The iUICC is a part encapsulated in a modem chip. A hardware bearer of the iUICC may be a secure element (Secure Element). The iUICC is connected to another component inside a chip by using a bus (bus) or a high-speed bus (bus) inside the chip. Alternatively, the iUICC may also be implemented by embedding a module corresponding to a subscriber identification module (SIM) in another chip, for example, an application processor chip.

Each eUICC has an identifier (eUICC-ID, EID) that uniquely identifies the eUICC. Each eUICC may download and install a plurality of bundles (Bundle) provided by different operators. The bundle includes a chip operating system (COS) and a profile (profile). The bundle herein may also be referred to as an image.

In the embodiments of the present subject matter, the bundles provided by the different operators may be RSP-Bundle or/and Bundle. RSPBundle indicates that a COS and a profile can continue to be downloaded and installed; Bundle indicates that a COS cannot be downloaded or installed. In the embodiments of the present subject matter, the COS may also be referred to as an OS.

Each profile has an integrated circuit card identifier (integrated circuit card ID, ICCID) that uniquely identifies the profile, and the ICCID may also be referred to as a profileID.

The profile (profile) is a collection of data and applications of an operator, and usually includes profile metadata, network access application parameters, other elements in a file system, and the like. The profile metadata includes a profile policy rule (PPR). There are two definitions of PPR: 1. The profile is not allowed to be disabled (disable); 2. The profile is not allowed to be deleted (delete). The network access application parameters include a user key Ki, an international mobile subscriber identity (IMSI), a mobile network operator-security domain (MNO-SD), a supplementary security domain (SSD), and a controlling authority security domain (CASD), an application (such as an NFC application), a JAVAcard program, and the like. A correspondence between the IMSI and the Ki is used to identify an identity of a user that requests network authentication.

The eUICC downloads, installs, and enables the profile. After the profile is enabled (enabledprofile), a file and an application in the terminal can be selected through an eUICC interface of the terminal. That is, the file and the application in the terminal can be used only after the profile is enabled.

Figure 1:
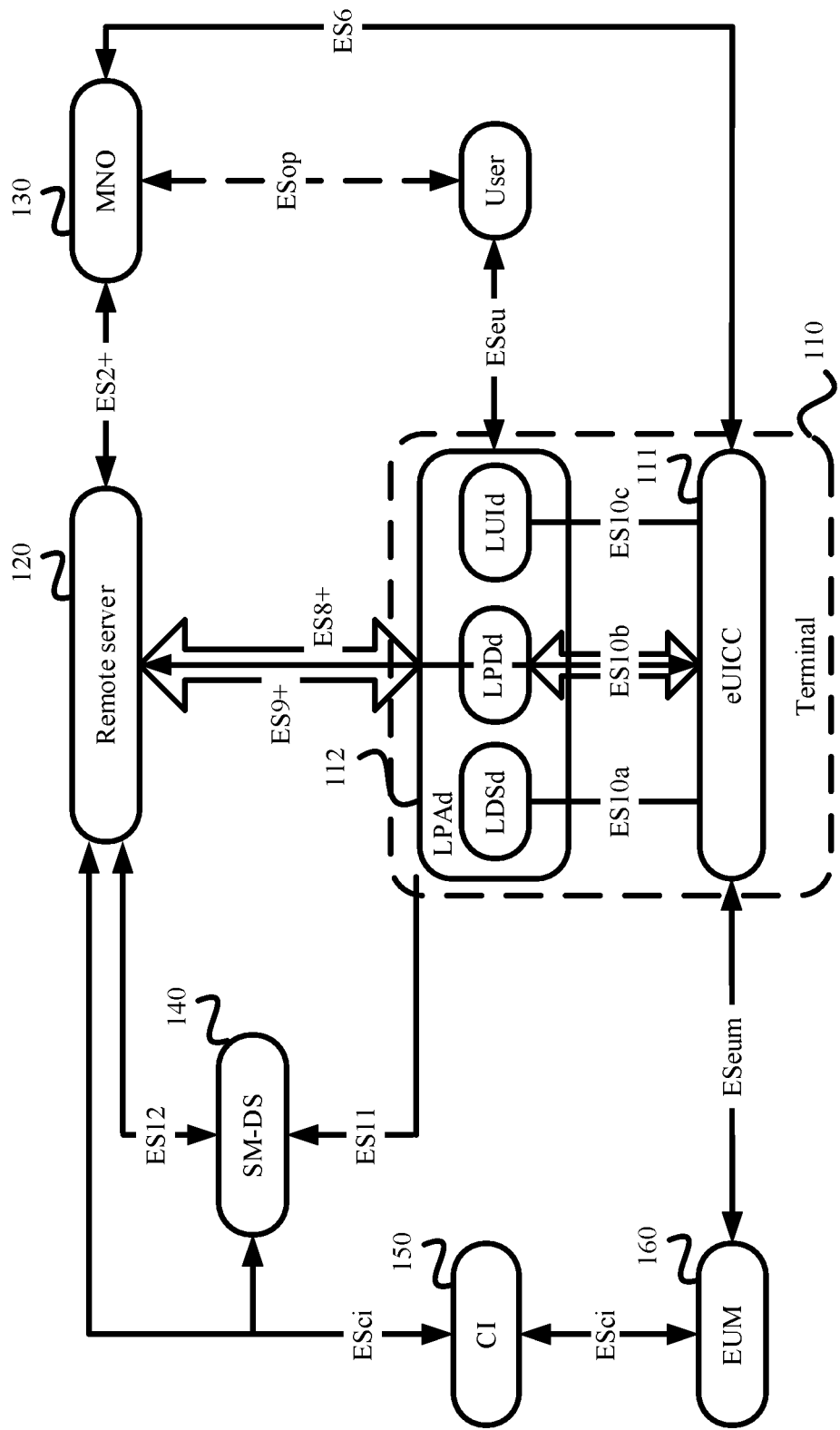
FIG. 1 is a schematic diagram of a system according to an embodiment of the present subject matter.

The following briefly describes an environment in which the eUICC is located by using FIG. 1. FIG. 1 is a schematic architectural diagram of a system according to an embodiment of the present subject matter.

As shown in FIG. 1, the system may include a terminal 110, a subscription manager-data preparation (SM-DP+) server 120, a mobile network operator (MNO) server 130, and a subscription manager-discovery server (SM-DS) 140, a CI server 150 and an eUICC manufacturer (EUM) server 160.

The terminal 110 may include an eUICC 111, a local profile assistant (LPA) 112, and a modem (Modem) (not shown in FIG. 1). The eUICC 111 is connected to the LPA 112 by using the modem. The LPA plays a role of interacting with the eUICC 111 in the terminal 110. Functions of the LPA include downloading a subscription file, discovering a service, providing a UI interface for a user, and the like. A user may further manage, by using the LPA, a profile (profile) downloaded onto the eUICC, for example, enable, disable, or delete the profile.

The terminal (terminal) herein may also be referred to as a system, a subscriber unit, a subscriber station, a mobile station, a mobile console, a remote station, a remote terminal, a mobile device, a user terminal, a mobile terminal, a wireless communications device, a user agent, a user apparatus, or user equipment (UE). For example, the terminal may be a cellular phone, a cordless phone, a smartwatch, a wearable device, a tablet device, a drone, a vending machine, a sensor device, a session initiation protocol (SIP) phone, a wireless local loop (WLL) station, a personal digital assistant (PDA), a handheld device with a wireless communication function, a computing device, a vehicle-mounted communications module, a smart meter, a smart home device, or another processing device connected to a wireless modem.

The SM-DP+ server 120 is configured to generate, based on basic information (such as an international mobile subscriber identity (IMSI)) provided by the MNO server 130, a profile that can be downloaded onto the eUICC 111. The SM-DP+ server 120 may also be referred to as a profile download server or a remote server. The SM-DP+ server (remote server) 120 is further configured to perform remote profile management, to be specific, execute a remote management request of an operator, and send a remote management request to the eUICC that downloads and installs the profile. The eUICC 111 executes the remote management request to implement remote management. The remote management request includes enabling, disabling, deleting, querying an eUICC status, and the like.

The SM-DS 140 is configured to provide a mechanism for the remote server 120 to communicate with the LPA 112. The LPA 112 communicates with the SM-DS 140 to obtain an address of the remote server 120, so as to obtain a corresponding event from the remote server corresponding to the address of the remote server 120. The event may be a remote profile management event or a profile download event.

The CI server 150 is configured to sign and issue certificates for the SM-DP+ server 120, the SM-DS 140, and the EUM server 160, respectively. The EUM server 160 signs and issues a certificate for the eUICC.

The EUM is an eUICC manufacturer, and manufactures and sells eUICC cards. A Certificate Issuer (certificateissuer, CI) is used to issue certificates for other entities, such as download servers.

The SM-DP+ server 120 can communicate with the MNO server 130 through an ES2+ interface; the MNO server 130 can communicate with the eUICC 111 through an ES6 interface; the remote server 120 can communicate with the LPA 112 through an ES9+ interface; the LPA 112 can communicate with the eUICC 111 through ES10a, ES10b, ES10c and other interfaces; the remote server 120 can communicate with the eUICC 111 through an ES8+ interface; the remote server 120 can communicate with the SM-DS 140 through an ES12 interface; SM-DS 140 can communicate with each other through an ES15 interface; and the SM-DS 140 can communicate with the LPA 112 through an ES11 interface. For details, refer to specification GSMA SGP.22.

Figure 2:
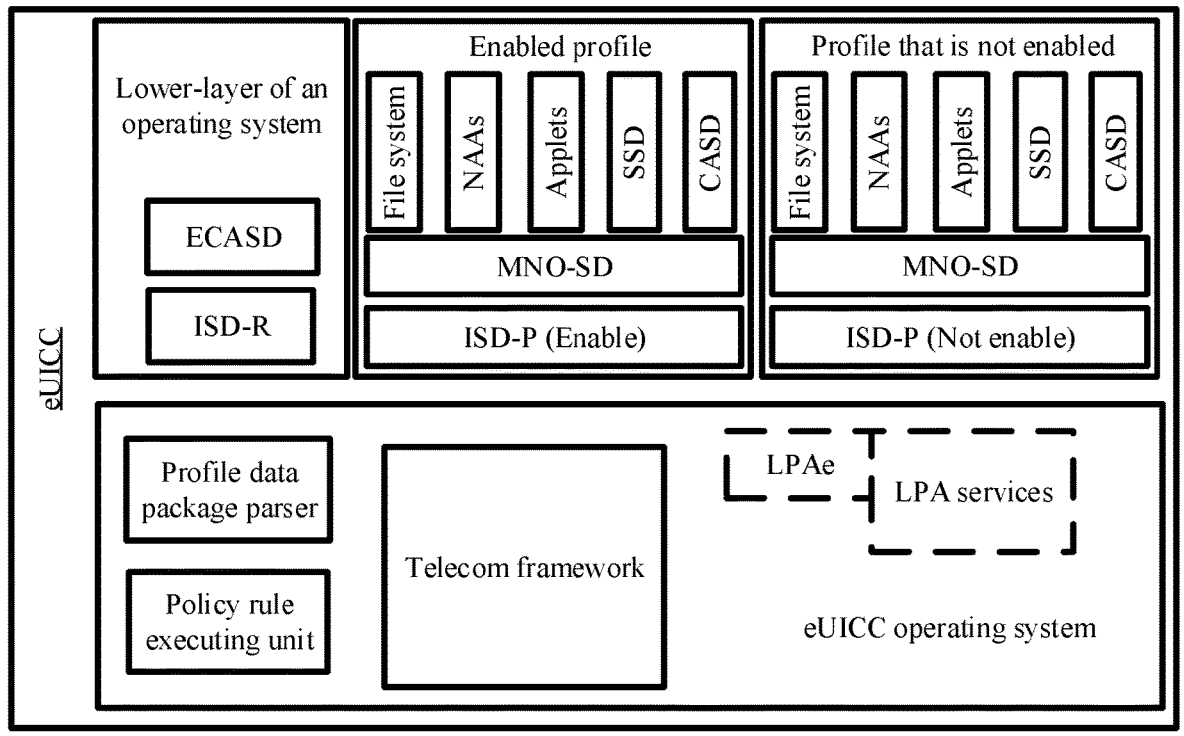
FIG. 2 is a schematic architectural diagram of an eUICC software layer according to an embodiment of the present subject matter.

FIG. 2 is a schematic architectural diagram of an eUICC software layer according to an embodiment of the present subject matter. As shown in FIG. 2, the eUICC includes an issuer security domain profile (ISD-P) part and an eUICC operating system (OS) structure. The eUICC OS includes an upper-layer part (the eUICC operating system) and a lower-layer part (eUICC OS low level components). The upper-layer part of the eUICC OS mainly includes an LPA in eUICC (LPA in eUICC, LPAe), LPA services (LPA services), a telecom framework (Telecom Framework), a profile package interpreter (profile package interpreter), and a profile policy enabler (profile policy enabler). The lower-layer part of the eUICC OS mainly includes an issuer security domain root (ISD-R), an elliptic curve cryptography digital signature algorithm (ECASD), an encryption algorithm, and the like.

The ISD-P is also referred to as a profile domain that is a space for storing a profile and that is used for decrypting and installing a profile (profile). The ISD-P stores a key used for secure communication with an SM-DP+ server outside the eUICC.

The ISD-R is mainly used to create a new ISD-P, and is responsible for life cycle management of all ISD-Ps. There is only one ISD-R in each eUICC. The ISD-R is installed and personalized by an EUM in an eUICC production process. The ISD-R cannot be deleted or disabled (disable).

In this embodiment of the present subject matter, the ISD-R has a profile policy management (profilepolicymanagement) function, and may include a rule authorization table (RAT) and a profile policy enabler (PPE).

The ECASD is mainly used to securely store a certificate and a key, to support a security domain in the eUICC. There is only one ECASD in each eUICC. The EUM may install and personalize the ECASD in an eUICC production process.

The ECASD may include: an eUICC private key (SK.EUICC.ECDSA), where the eUICC private key is used to create an ECDSA signature; and an eUICC certificate (CERT.EUICC.ECDSA), where the eUICC certificate is used for eUICC authentication, the eUICC certificate includes an eUICC public key (PK.EUICC.ECDSA), a public key of a GSMA certificate issuer (CI) (PK.CI.ECDSA), the public keys are used to verify certificates of network elements (such as the SM-DP+ server) outside the eUICC, the ECASD may include a plurality of public keys for a same or different GSMACI, an EUM certificate (CERT.EUM.ECDSA) and an EUM key are used to update the key and the certificate.

The ECASD may provide the ISD-R with the following services: generating the eUICC signatures based on information provided by the ISD-R; and verifying network elements (such as the SM-DP+ server) outside the eUICC by using the CI public key (PK.CI.ECDSA).

FIG. 2 shows two profiles: One is an enabled profile and the other is an unenabled profile. Each profile further includes a file system, at least one NAA, applets (applets), an MNO-SD, an SSD, and a CASD.

Figure 3:
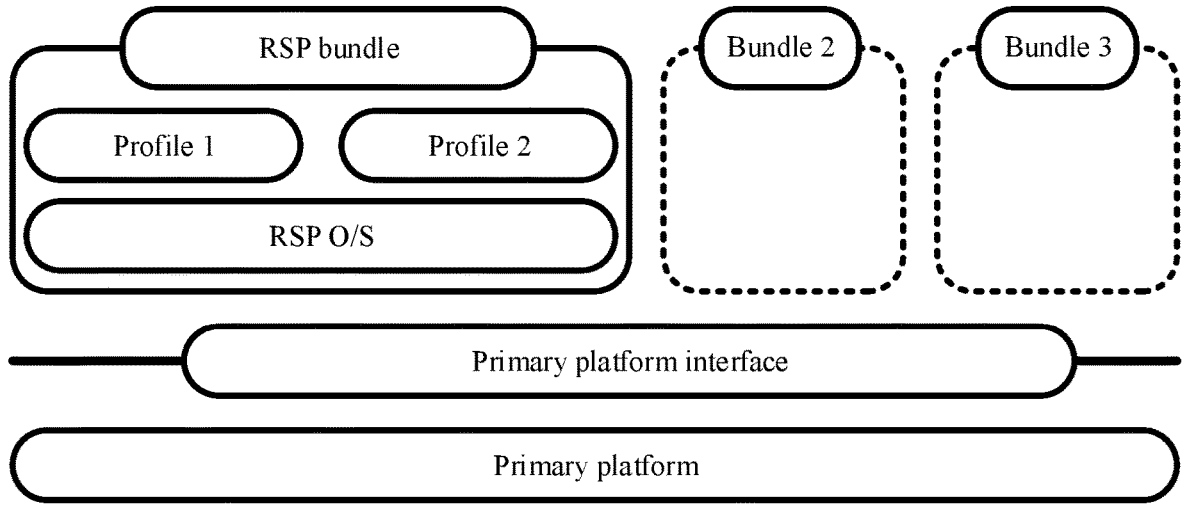
FIG. 3 is a schematic diagram of a scenario according to an embodiment of the present subject matter.
Figure 4:
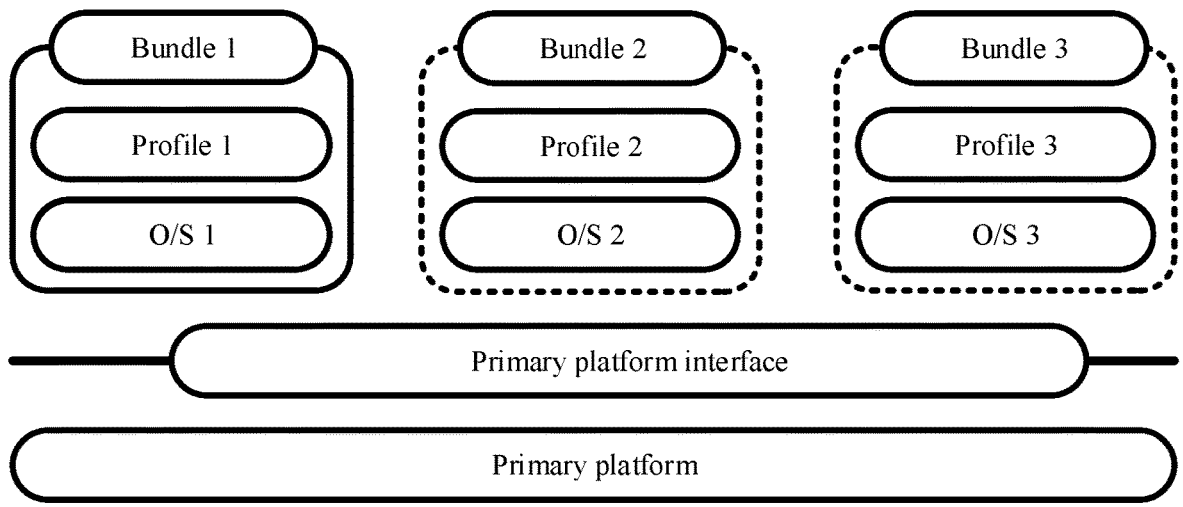
FIG. 4 is a schematic diagram of another scenario according to an embodiment of the present subject matter.
Figure 5:
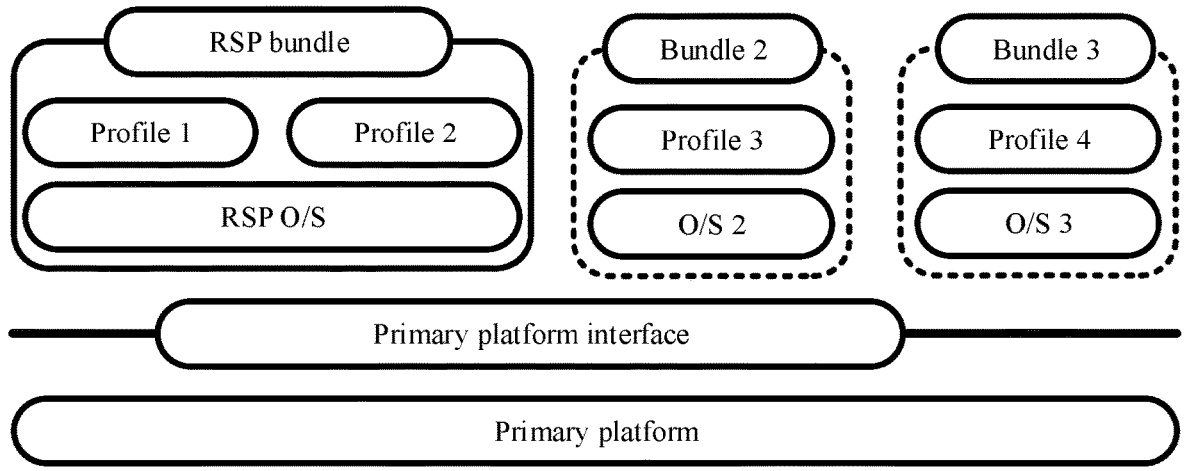
FIG. 5 is a schematic diagram of still another scenario according to an embodiment of the present subject matter.

In the schematic structural diagram shown in FIG. 2, the profile shown in FIG. 3 can be switched. The switching herein is disabling a profile that is currently running in the eUICC, and enabling another enabled profile. As shown in FIG. 3, the eUICC installs an RSP bundle. Each bundle may include one OS and at least one profile. When the profile needs to be switched, the profile may be switched by using an ISD-R in a same OS. However, profiles cannot be switched between different OSs, as shown in FIG. 4 and FIG. 5. The RSP bundle may include only one OS or only one profile (profile).

To resolve a problem in this embodiment of the present subject matter that local profile management of an RSP server cannot be applied to a scenario in which there are a plurality of profiles in a plurality of OSs, the ISD-R at the lower layer of the eUICC OS in FIG. 2 is disposed on a primary platform (PrimaryPlatform) of the eUICC. In other words, the ISD-R is added to the primary platform. The primary platform herein is a hardware platform of the eUICC, and includes a bootloader (Bootloader). When the terminal is powered on, the bootloader guides execution of some operations. The ISD-R may not be added to the primary platform, and the primary platform performs an operation similar to that of the ISD-R. The ISD-R may also exist in a form of another software module.

FIG. 4 and FIG. 5 are schematic diagrams of two different scenarios according to the embodiments of the present subject matter.

In FIG. 4, each bundle (Bundle, which may also be referred to as a data packet or a file package) allowed to be installed in the eUICC may include an operating system OS and at least one profile, and an ISD-R is provided on a primary platform (PrimaryPlatform) of the eUICC. Because profiles are in different OSs, when the profiles need to be switched, the ISD-R provided on the primary platform can be used to complete the profile switching.

In FIG. 5, a plurality of RSP bundles and a plurality of bundles shown in FIG. 4 are allowed to be installed in the eUICC. To be specific, a scenario in FIG. 5 includes a scenario shown in FIG. 3 and a scenario shown in FIG. 4. An ISD-R is provided on a primary platform (PrimaryPlatform) of the eUICC. In this scenario, regardless of whether the profiles that need to be switched are in a same OS, the profiles may be switched by using the ISD-R provided on the primary platform.

In this embodiment of the present subject matter, a profile policy enabler (PPE) may be further added to an LPA to allow the LPA to implement a function of a PPR, so as to complete profile switching between different OSs.

The following describes methods for managing a profile provided in embodiments of the present subject matter with reference to FIG. 6 to FIG. 10B. In solutions of FIG. 6 to FIG. 10B, an ISD-R is provided on a primary platform (PrimaryPlatform) of an eUICC. The ISD-R may also be referred to as a processing module.

Figure 6:
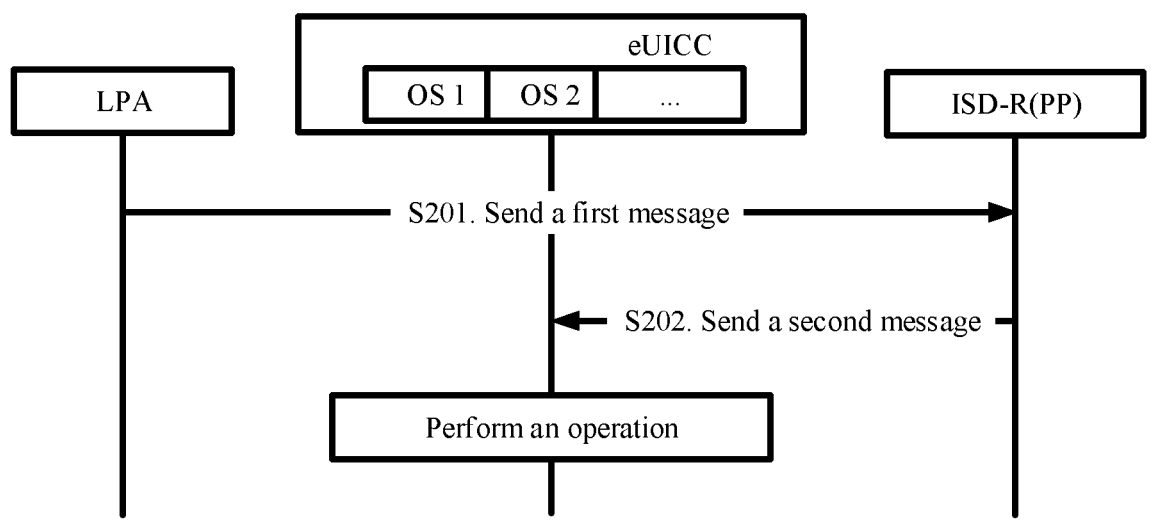
FIG. 6 is a flowchart of a method for managing a local profile according to an embodiment of the present subject matter.

FIG. 6 is a method for managing a profile according to an embodiment of the present subject matter. As shown in FIG. 6, the method may include the following steps.

S201. The ISD-R receives a first message sent by an LPA.

The first message is an operation instruction that is entered by a user and that is received by the LPA. The operation instruction may be a profile enabling operation instruction or an eUICC memory reset (eUICC memory reset) command. The eUICC memory reset command may include indication information, to instruct to delete an operational profile from at least one OS (delete operation profiles on all OS) in the eUICC, or to instruct to delete field test profiles (delete Field Test Profiles). The "delete field test profiles" herein is actually deleting the test profile (test profile) preset before delivery. In the solutions of the present subject matter, the deleting the test profile means deleting the test profile preset before delivery.

S202. The ISD-R sends a second message to the at least one OS installed in the eUICC.

The second message is used by the OS to perform a corresponding operation after receiving the message, so as to implement switching of profiles between different OSs.

The following describes the method for managing a profile in this embodiment of the present subject matter by using profile enabling and eUICC memory resetting as an example. As shown in FIG. 7A to FIG. 10B, In FIG. 7A to FIG. 10B, descriptions are provided by using an example in which two bundles are installed in an eUICC. For example, an OS 1 and an OS 2 are installed in the eUICC, and the OS 1 and the OS 2 are separately installed with one profile. A profile 1 (profile1) is installed in the OS 1 and a profile 2 (profile2) is installed in the OS 2. There are two cases for the two bundles installed in the eUICC: 1. Both the two bundles are downloaded and installed from an SM-DP+ server (as shown in FIG. 7A to FIG. 8B). 2. One bundle is preset by default (default) before delivery of the eUICC or an iUICC, and the default bundle may include only one OS. The profile can be downloaded into the default OS in an over-the-air download form and run. The other bundle is downloaded and installed from the SM-DP+ server (as shown in FIG. 9A to FIG. 10B).

Figure 7A:
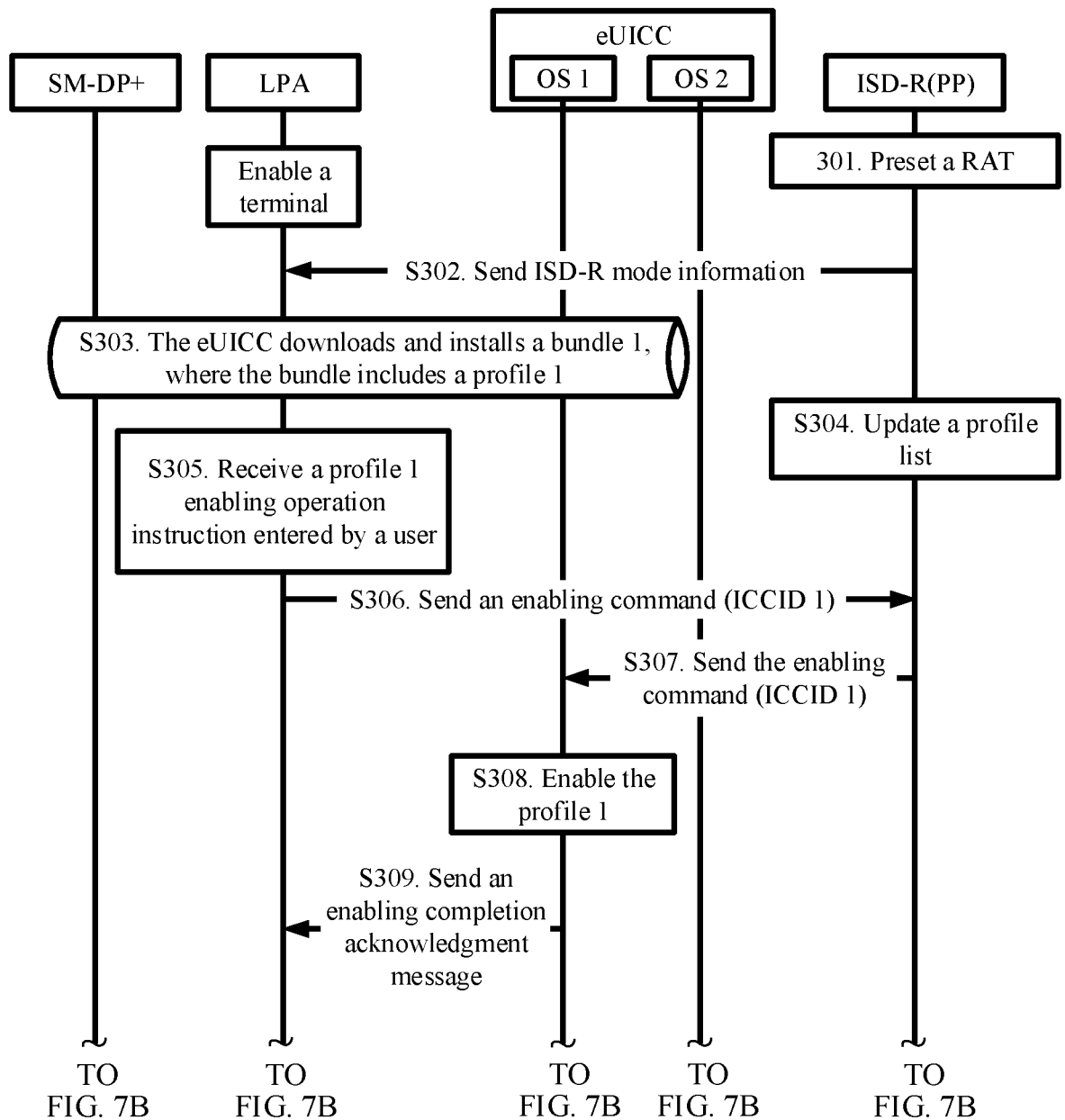
FIG. 7A and FIG. 7B are a flowchart of a method for managing a local profile according to an embodiment of the present subject matter.
Figure 7B:
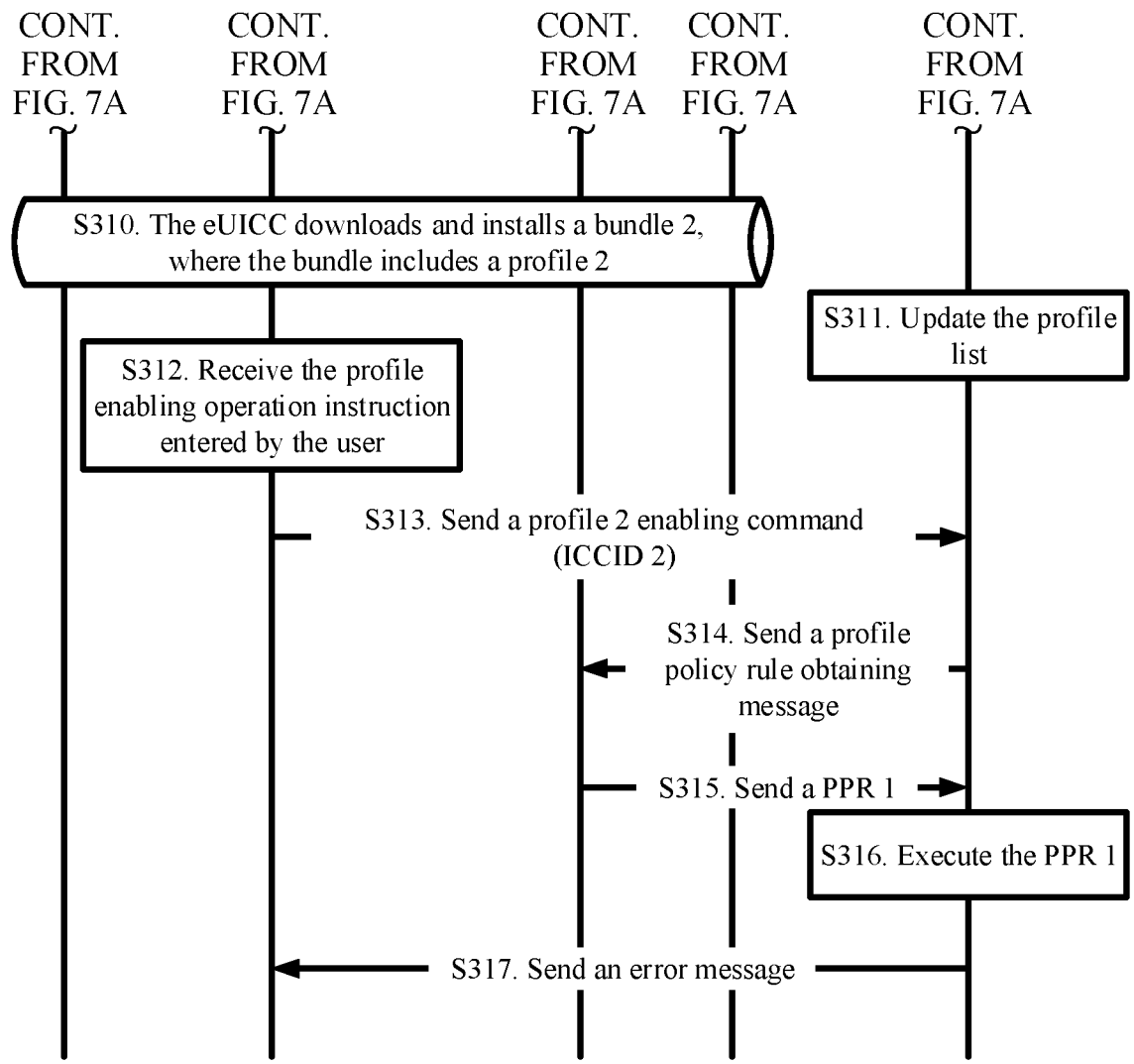

FIG. 7A and FIG. 7B are a schematic flowchart of a method for enabling a profile according to an embodiment of the present subject matter. As shown in FIG. 7A and FIG. 7B, the method may include the following steps.

S301. The ISD-R presets an RAT.

The RAT includes a PPR 1 and a PPR 2. In this embodiment of the present subject matter, the PPR 1 is a profile (profile) and cannot be disabled. The PPR 2 is a profile (profile) and cannot be deleted. Whether the PPR included in the specific profile is the PPR 1 or the PPR 2 is determined by an operator.

S302. The ISD-R sends ISD-R mode (ISD-R mode) information to an LPA.

After a terminal is powered on, in a process in which an SM-DP+ server and the eUICC perform two-way authentication, the eUICC adds ppISDRCapability to second eUICC information (euiccinfo2), and sends the second eUICC information to the LPA. Specifically, the sending the euiccinfo2 information can be sending, to the SM-DP+ server, a message from an authentication client (AuthenticateClient) used in two-way authentication, where the ppISDRCapability is the ISD-R mode information. To be specific, when the LPA starts to work, the LPA receives the ISD-R mode information sent by the ISD-R on a primary platform of the eUICC. The ISD-R mode information is used to instruct the LPA to send a corresponding message to the ISD-R when receiving an operation instruction entered by a user. For example, the user enters a profile enabling operation instruction; in this case, when receiving the profile enabling operation instruction entered by the user, the LPA sends a profile enabling command to the ISD-R on the primary platform. In other words, the ISD-R mode information is used to notify the LPA that the primary platform of the eUICC also has an ISD-R. In this way, when receiving a local profile management command, the LPA sends a corresponding command to the ISD-R on the primary platform.

S303. The eUICC downloads and installs a bundle 1 (image1).

The eUICC downloads and installs the bundle 1 from the SM-DP+ server by using the LPA. The bundle 1 includes an OS 1 and a profile 1.

S304. The ISD-R updates a profile list based on the bundle 1.

The profile list includes an OS identifier OSID and an ICCID corresponding to a profile installed in the OS. When the eUICC downloads and installs the bundle 1, the ISD-R updates the profile list based on the OS 1 and the profile 1 that are included in the bundle, and stores, in the profile list, an identifier of the OS 1 and an ICCID 1 corresponding to the profile 1.

S305. The LPA receives a profile 1 enabling operation instruction entered by a user.

The user can choose to enable a profile 1 on a primary platform interface (Primary Platform Interface), that is, enter the profile 1 enabling command. The operation instruction includes the ICCID 1 corresponding to the profile 1.

S306. The LPA sends an enabling command to the ISD-R, where the enabling command includes the ICCID 1.

S307. The ISD-R sends the enabling command to the OS 1 based on the profile list.

The enabling command includes the ICCID 1. The OS 1 performs S311 after receiving the enabling command.

S308. Enable the profile 1.

S309. The OS 1 sends an enabling completion acknowledgment message to the LPA.

S310. The eUICC downloads and installs a bundle 2 (image2).

The eUICC downloads and installs the bundle 2 from the SM-DP+ server by using the LPA. The bundle 2 includes an OS 2 and a profile 2.

S311. The ISD-R updates the profile list based on the bundle 2.

The profile list includes an OS identifier OSID and an ICCID corresponding to the profile installed in the OS. When the eUICC downloads and installs the bundle 2, the ISD-R updates the profile list based on the OS 2 and the profile that are included in the bundle, and stores, in the profile list, an identifier of the OS 2 and an ICCID 2 corresponding to the profile 2.

In this embodiment of the present subject matter, a sequence in which the eUICC downloads and installs the bundle 1 and the bundle 2 is not limited. The bundle 2 may be downloaded and installed before the bundle 1, or the bundle 1 and the bundle 2 may be downloaded and installed at a same time. The profile 1 is enabled after the bundle 1 is downloaded and installed.

S312. The LPA receives the profile enabling operation instruction entered by the user.

When the eUICC downloads and installs the OSs: the OS 1 and the OS 2, and enables the profile 1 installed in the OS 1, the user can choose to enable the profile 2 on the primary platform interface (Primary Platform Interface), that is, enter the profile 2 enabling command.

S313. The LPA sends a profile 2 enabling command to the ISD-R.

The profile enabling command includes the ICCID 2 corresponding to the profile 2. After receiving the profile 2 enabling command, the ISD-R performs S314.

S314. The ISD-R sends a profile policy rule obtaining (GetPPR) message to the OS 1.

The profile policy rule obtaining message includes the ICCID 1 corresponding to the profile 1.

In this embodiment of the present subject matter, the ISD-R sends, to an OS in which an enabled profile is located, the profile policy rule obtaining message. If there are a plurality of enabled profiles in this embodiment, the ISD-R sends, to the OSs corresponding to the plurality of enabled profiles, profile policy rule obtaining messages, to obtain profile policy rules of the plurality of enabled profiles.

S315. The OS 1 sends the profile policy rule PPR 1 to the ISD-R.

S316. The ISD-R executes the profile policy rule PPR 1.

After receiving the PPR 1 sent by the OS 1, the ISD-R compares the PPR 1 with the profile policy authorization rules (Profile Policy Authorization Rules, PPAR) in the RAT, where the RAT is preset in the ISD-R. When the PPAR includes the PPR 1, the ISD-R executes the PPR 1.

When the ISD-R determines that the PPR 1 does not allow disabling, or when the ISD-R determines that the profile 1 corresponding to the PPR 1 is not allowed to be disabled, in other words, when the ISD-R determines that the currently loaded profile 1 is not allowed to be disabled, S317 is performed.

S317. The ISD-R sends an error message to the LPA.

According to the method provided in this embodiment of the present subject matter, profiles in a same OS can be enabled, or profiles in different OSs can be enabled.

Figure 8A:
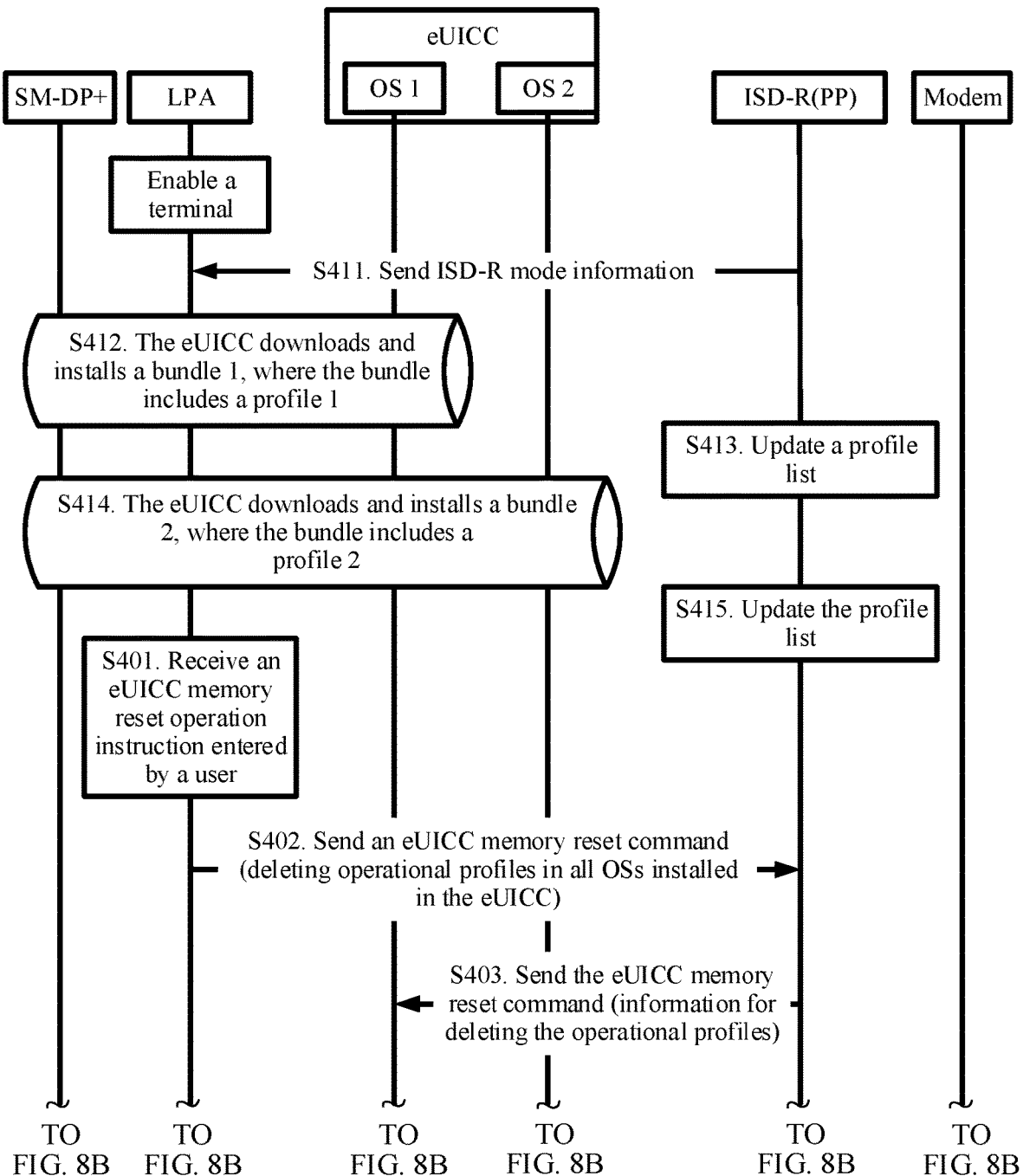
FIG. 8A and FIG. 8B are a flowchart of a method for resetting a memory according to an embodiment of the present subject matter.
Figure 8B:
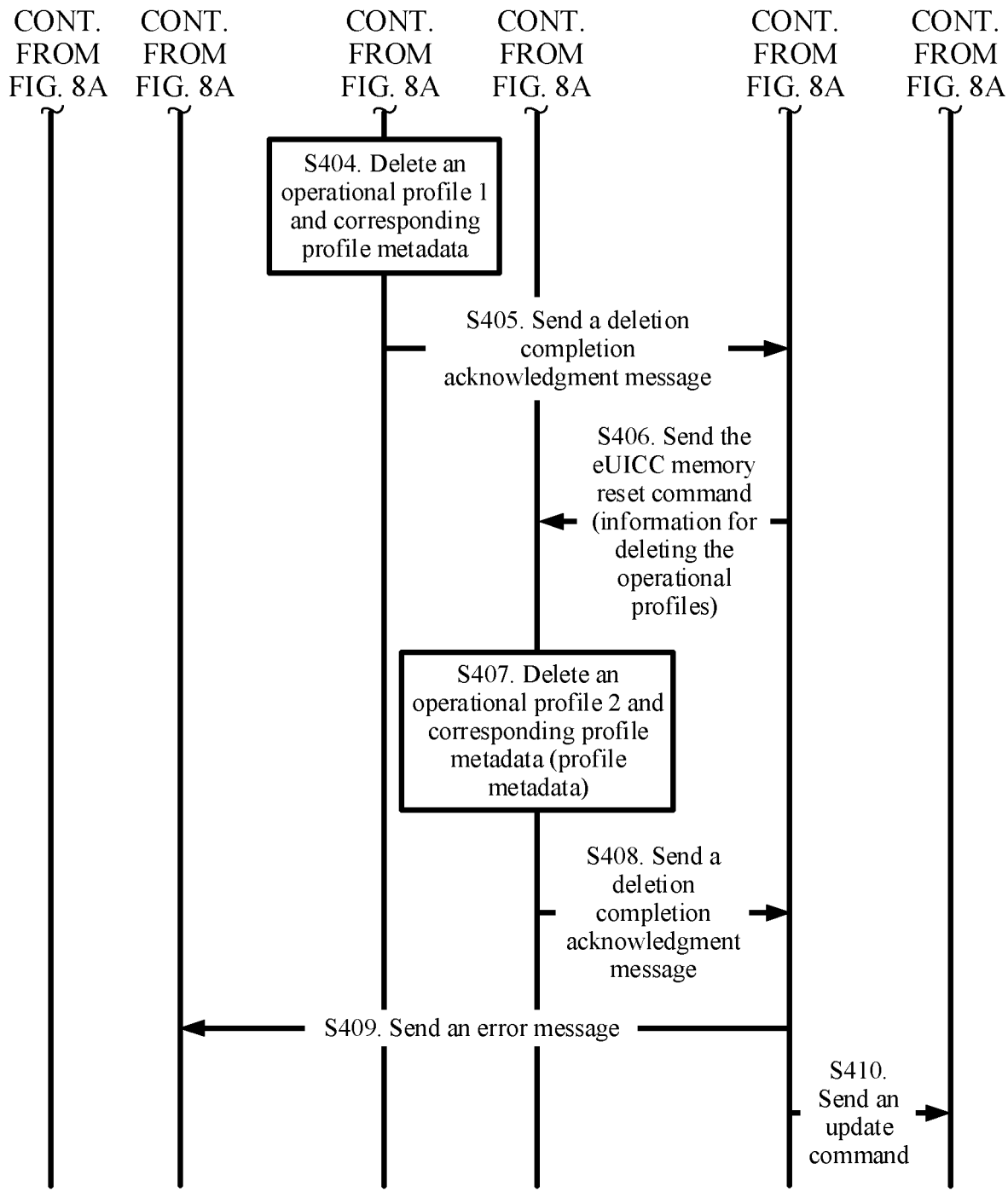

FIG. 8A and FIG. 8B are a flowchart of a method for resetting a memory according to an embodiment of the present subject matter. As shown in FIG. 8A and FIG. 8B, the method may include the following steps.

S401. The LPA receives an eUICC memory reset operation instruction entered by a user.

After the eUICC downloads and installs OSs: an OS 1 and an OS 2, the user may select an eUICC memory reset (eUICC memory reset) instruction on a primary platform interface (Primary Platform Interface), that is, enter the eUICC memory reset operation instruction.

S402. The LPA sends an eUICC memory reset command to the ISD-R.

The eUICC memory reset command includes indication information used to instruct to delete operational profiles (operational profile) from all the OSs installed in the eUICC. After receiving the eUICC memory reset command, the ISD-R performs S403.

S403. The ISD-R sends the eUICC memory reset command to the OS 1.

The eUICC memory reset command includes indication information that is information used to instruct to delete the operational profiles.

S404. The OS 1 deletes an operational profile 1 and corresponding profile metadata (profile metadata), and restores an SM-DP+ server address to an initial address.

In this embodiment of the present subject matter, the profile metadata corresponding to the profile 1 includes a PPR of the profile 1. The OS 1 deletes all operational profiles from the OS 1 based on the received eUICC memory reset command.

In this embodiment of the present subject matter, the profile metadata is stored in the profile, and deleting the profile means deleting the profile metadata from the profile.

S405. The OS 1 sends a deletion completion acknowledgment message to the ISD-R.

S406. The ISD-R sends the eUICC memory reset command to the OS 2.

The eUICC memory reset command includes the information for deleting the operational profiles.

S407. The OS 2 deletes an operational profile 2 and corresponding profile metadata (profile metadata), and restores the SM-DP+ server address to the initial address.

The profile metadata corresponding to the profile 2 includes a PPR of the profile 2.

In this embodiment of the present subject matter, the OS 2 deletes all operational profiles from the OS 2 based on the received eUICC memory reset command.

S408. The OS 2 sends a deletion completion acknowledgment message to the ISD-R.

In this embodiment of the present subject matter, a sequence in which the ISD-R sends the eUICC memory reset command to the OS 1 and the OS 2 may not be limited, or the ISD-R may send the eUICC memory reset command to the OS 1 and the OS 2 at a same time.

S409. After the ISD-R receives deletion completion acknowledgment messages sent by both the OSs installed in the eUICC, the ISD-R sends a deletion completion acknowledgment message to the LPA.

S410. The ISD-R sends a refresh (REFRESH) command to a modem (modem).

Optionally, as shown in FIG. 8A, before the LPA sends the eUICC memory reset command to the ISD-R, and after the device is powered on, the method may further include the following steps.

S411. The LPA receives ISD-R mode information sent by the ISD-R.

The ISD-R mode information is used to instruct the LPA to send a corresponding message to the ISD-R when the PLA receives the operation instruction entered by the user.

S412. The eUICC downloads and installs a bundle 1 (image1).

The eUICC downloads and installs the bundle 1 from an SM-DP+ server by using the LPA. The bundle 1 includes the OS 1 and a profile 1, and the profile 1 includes a PPR 1.

S413. The ISD-R updates a profile list based on the bundle 1.

S414. The eUICC downloads and installs a bundle 2 (image2).

The bundle 2 includes the OS 2 and a profile 2, and the profile 2 includes a PPR 2.

S415. The ISD-R updates the profile list based on the bundle 2.

A process of updating the profile list in this embodiment of the present subject matter is the same as the process of updating the profile list in FIG. 7A and FIG. 7B. For brevity of description, details are not described herein again.

Figure 9A:
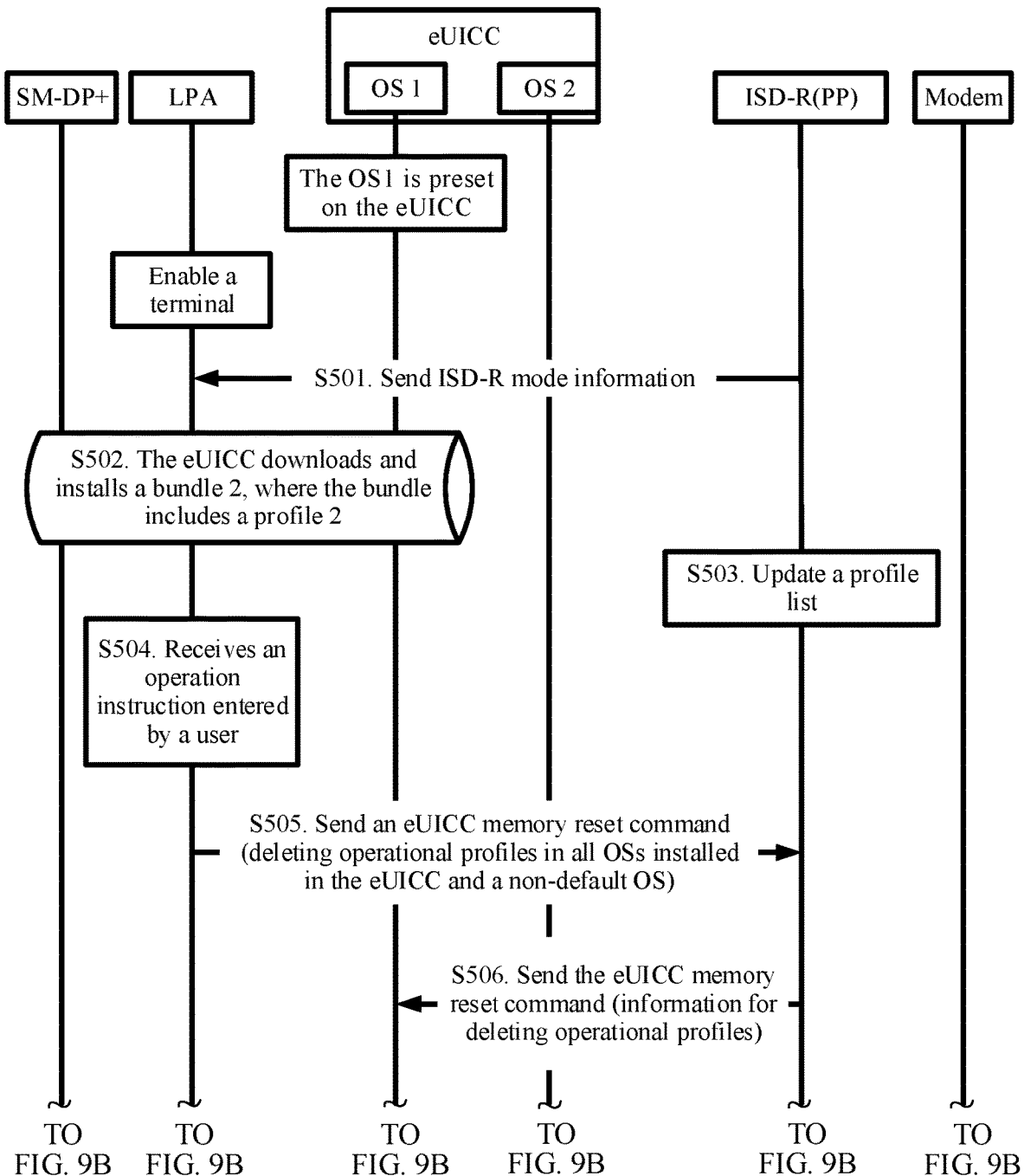
FIG. 9A and FIG. 9B are a flowchart of another method for resetting a memory according to an embodiment of the present subject matter.
Figure 9B:
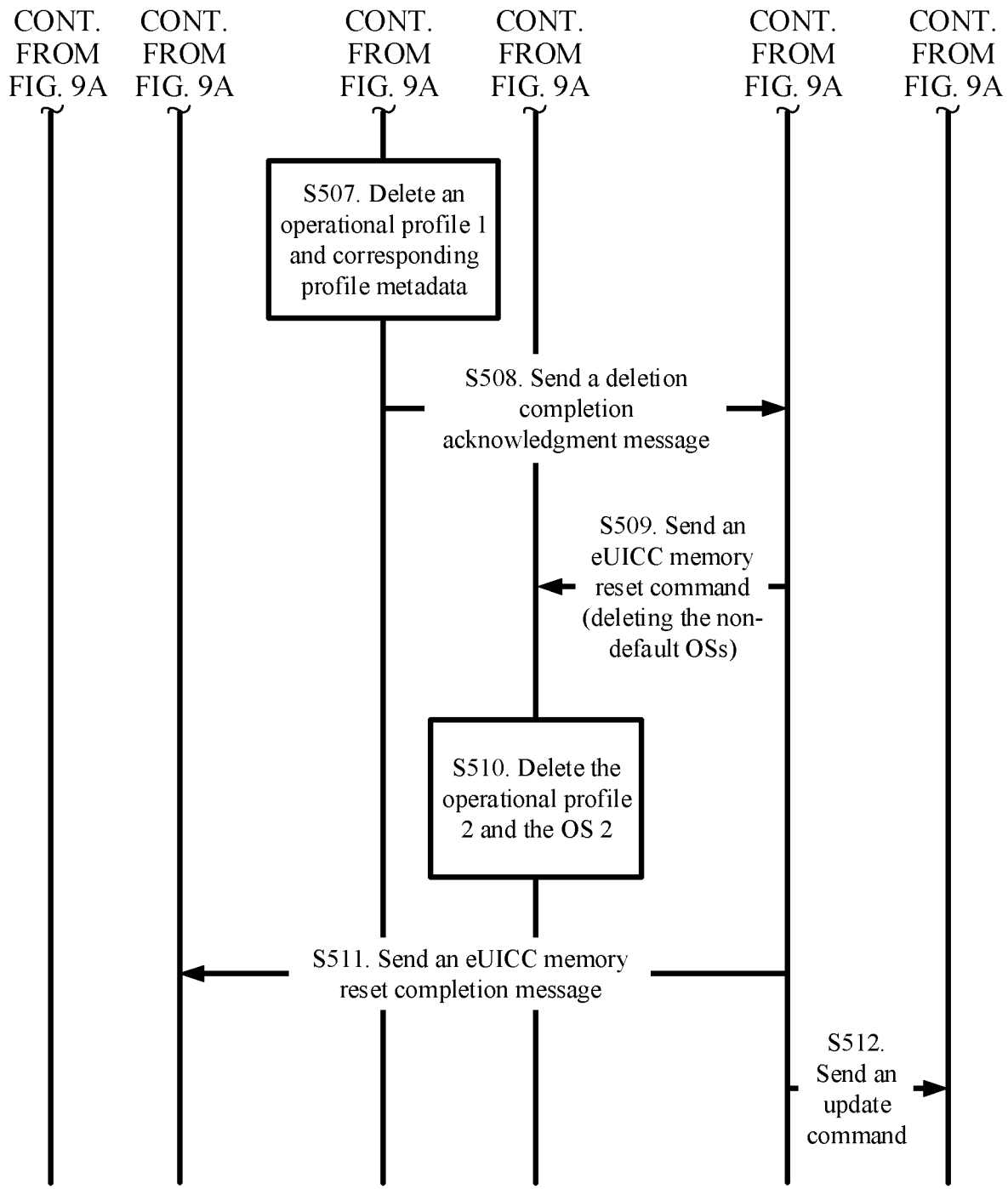

FIG. 9A and FIG. 9B are a flowchart of another method for resetting a memory according to an embodiment of the present subject matter.

Different from FIG. 8A and FIG. 8B, in FIG. 9A and FIG. 9B, the OS 1 is preset on the eUICC. After receiving the eUICC memory reset command, the ISD-R deletes profiles from a plurality of OSs, and deletes a non-default (default) OS. The non-default OS herein is an OS other than an OS preset on the eUICC before delivery. For example, the OS 2 that is installed in the eUICC and that is corresponding to the bundle 2 is deleted.

As shown in FIG. 9A and FIG. 9B, the method may include the following steps.

S501. The LPA receives ISD-R mode information sent by the ISD-R.

S502. The eUICC downloads and installs a bundle 2.

The eUICC downloads the bundle 2 from an SM-DP+ server by using the LPA. The bundle 2 includes an OS 2 and a profile 2.

S503. The ISD-R updates a profile list.

The ISD-R updates the profile list based on the bundle 2, and stores, in the profile list, an identifier of an OS in the bundle 2 and an ICCID 2 corresponding to the profile 2 installed in the OS 2.

S504. The LPA receives an operation instruction entered by a user.

S505. The LPA sends an eUICC memory reset command to the ISD-R.

The eUICC memory reset command includes indication information (DeleteBundles and DeleteOperational Profile), and is used to instruct to delete an operational profile (operational profile) from all the OSs installed in the eUICC and delete the bundles (DeleteBundles). The information for deleting the bundles is used to instruct to delete a non-default OS.

S506. The ISD-R sends the eUICC memory reset command to the OS 1.

After receiving the eUICC memory reset command, the ISD-R sends the eUICC memory reset command to the OS 1, where the eUICC memory reset command includes information for deleting an operational profile (DeleteOperationalProfile).

S507. The OS 1 deletes an operational profile 1 and corresponding profile metadata (profile metadata), and restores an SM-DP+ server address to an initial address.

The profile metadata corresponding to the profile 1 includes a PPR of the profile 1.

In this embodiment of the present subject matter, the OS 1 deletes all operational profiles from the OS 1 based on the received eUICC memory reset command.

S508. The OS 1 sends a deletion completion acknowledgment message to the ISD-R.

S509. The ISD-R sends the eUICC memory reset command to the OS 2.

The eUICC memory reset command includes information for deleting the bundles (DeleteBundles), and is used to instruct to delete the non-default OS.

S510. The OS 2 deletes the profile 2, and the OS 2 is deleted.

Optionally, when a plurality of profiles are installed in the OS 2, the OS 2 deletes the plurality of profiles from the OS 2, and the OS 2 is deleted. The deleting the plurality of profiles herein is deleting all operational profiles from the OS 2.

S511. When the ISD-R detects that the OS 2 has been deleted, the ISD-R sends an eUICC memory reset completion message to the LPA.

S512. The ISD-R sends a refresh (REFRESH) command to a modem.

Figure 10A:
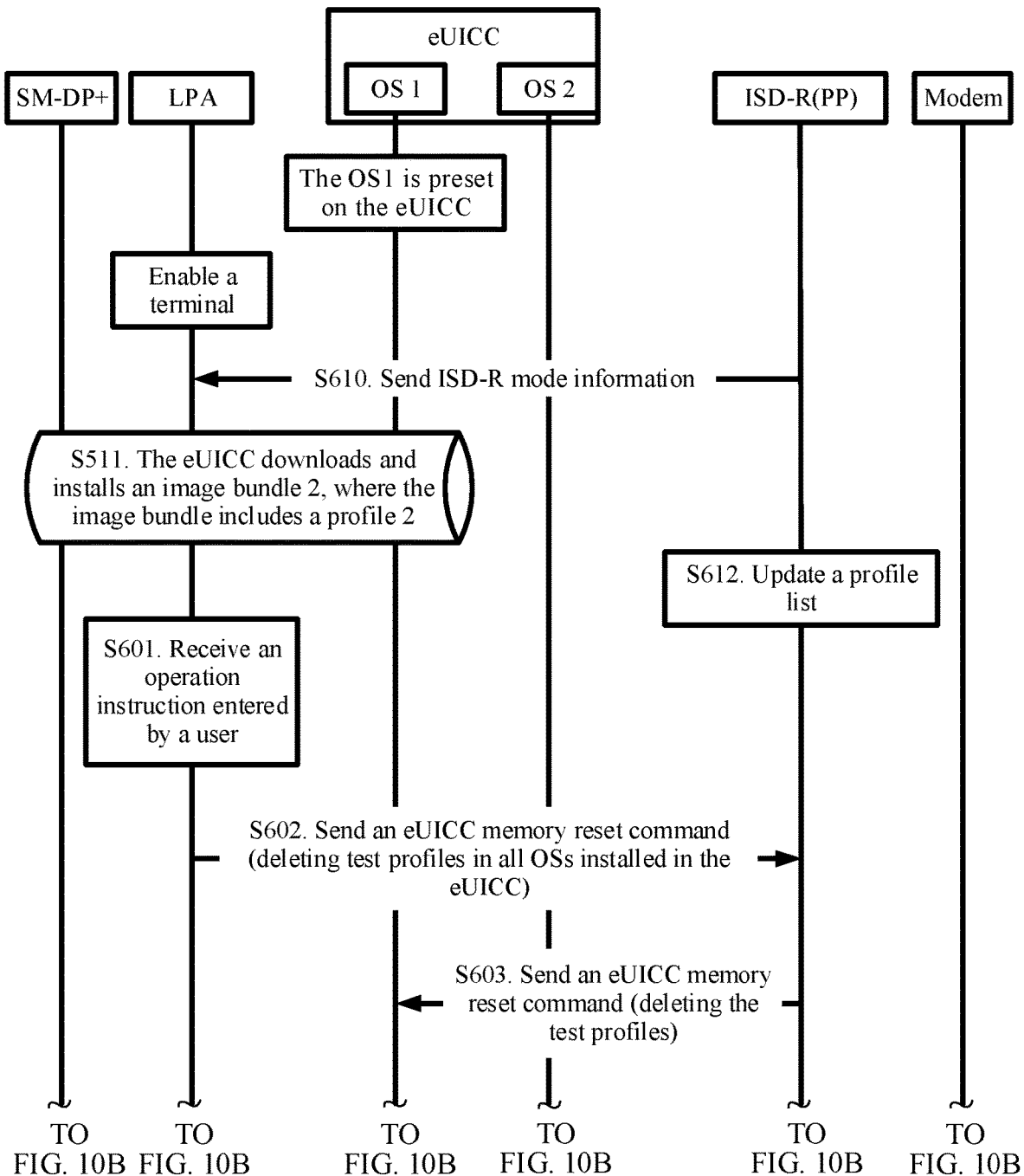
FIG. 10A and FIG. 10B are a flowchart of still another method for resetting a memory according to an embodiment of the present subject matter.
Figure 10B:
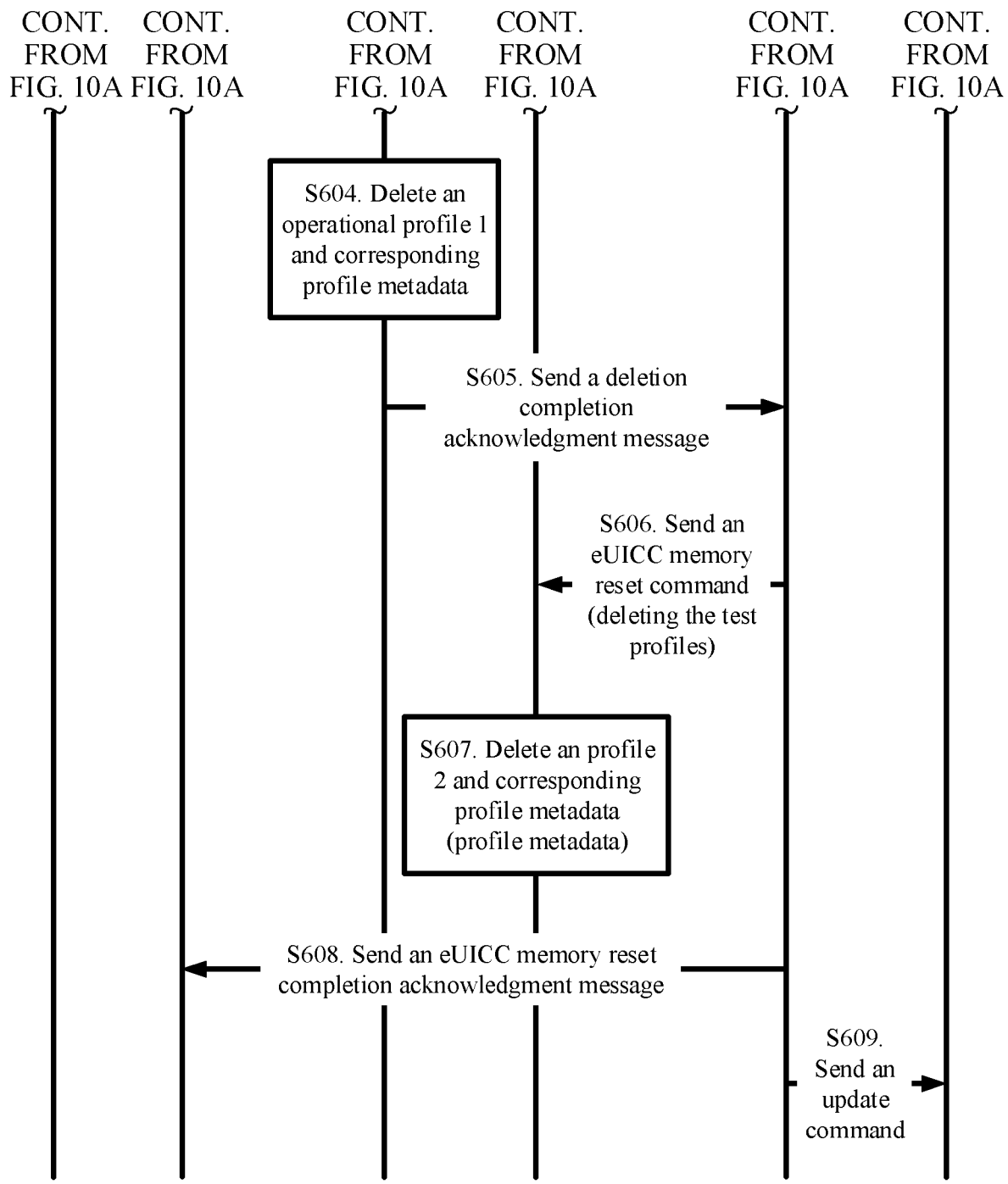

FIG. 10A and FIG. 10B are a flowchart of still another method for resetting a memory according to an embodiment of the present subject matter.

A difference between the embodiment shown in FIG. 10A and FIG. 10B and the embodiment shown in FIG. 8A and FIG. 8B lies in that, the memory reset in FIG. 8A and FIG. 8B is to delete the operational profiles installed in the OSs, while the memory reset in FIG. 10A and FIG. 10B is to delete field test profiles (delete Field Test Profiles) from the OSs. Actually, the deleting field test profiles is deleting test profiles (test profile) preset before delivery. In addition, a process of steps S601 to S612 in FIG. 10A and FIG. 10B is similar to a process of steps S501 to S512 in FIG. 9A and FIG. 9B, and a specific process is as follows.

S601. The LPA receives an eUICC memory reset operation instruction entered by a user.

S602. The LPA sends an eUICC memory reset command to the ISD-R.

The eUICC memory reset command includes information for deleting field test profiles (delete Field Test Profiles) from all OSs installed in the eUICC. After the ISD-R receives the eUICC memory reset command, S603. The ISD-R sends the eUICC memory reset command to an OS 1.

After receiving the eUICC memory reset command, the ISD-R sends the eUICC memory reset command to the OS 1, where the eUICC memory reset command includes the information for deleting the test profiles.

S604. The OS 1 deletes an operational profile 1 and corresponding profile metadata (profile metadata).

In this embodiment of the present subject matter, the OS 1 deletes all test profiles in at least one ISD-P from the OS 1 based on the received eUICC memory reset command.

S605. The OS 1 sends a deletion completion acknowledgment message to the ISD-R.

S606. The ISD-R sends the eUICC memory reset command to an OS 2.

The eUICC memory reset command includes the information for deleting the test profiles.

S607. The OS 2 deletes an operational profile 2 and corresponding profile metadata (profile metadata).

In this embodiment of the present subject matter, the OS 2 deletes all test profiles from the OS 2 based on the received eUICC memory reset command.

S608. The OS 2 sends a deletion completion acknowledgment message to the ISD-R.

In this embodiment of the present subject matter, a sequence in which the ISD-R sends the eUICC memory reset command to the OS 1 and the OS 2 may not be limited, or the ISD-R may send the eUICC memory reset command to the OS 1 and the OS 2 at a same time.

S609. The ISD-R sends a refresh (REFRESH) command to a modem.

Optionally, in this embodiment of the present subject matter, before the LPA receives the eUICC memory reset operation instruction entered by the user, the method further includes S610 to S612. A process of S610 to S612 in FIG. 10A is the same as a process of S501 to S503 in FIG. 9A. For brevity of description, details are not described herein again.

Optionally, in an embodiment of the present subject matter, an eUICC memory may be reset by deleting a test profile and a non-default OS. This process may be similar to a process of deleting all the operational profiles and the default OS in FIG. 9A and FIG. 9B. For brevity of description, details are not described herein again.

FIG. 6 to FIG. 10B show that the ISD-R is provided on the primary platform of the eUICC to implement profile management across the OSs. The following describes, with reference to FIG. 11A and FIG. 11B, profile local management across OSs by using an LPA.

In this embodiment of the present subject matter, the LPA has a function of executing a PPR. To be specific, a profile policy enabler (PPE) may be added to the LPA, so that the LPA implements the function of executing the PPR, to switch profiles between different operating systems.

In this embodiment of the present subject matter, description is provided by using an example in which an eUICC downloads and installs two bundles, to be specific, the eUICC installs an OS 1 and an OS 2, and a profile is installed in each of the OS 1 and the OS 2. A profile 1 (profile1) is installed in the OS 1, and a profile 2 (profile2) is installed in the OS 2.

It should be further noted that in this embodiment of the present subject matter, "first" and "second" are merely used to distinguish between information, bundles, or profiles, and do not limit the information, the bundles, or the profiles.

Figure 11A:
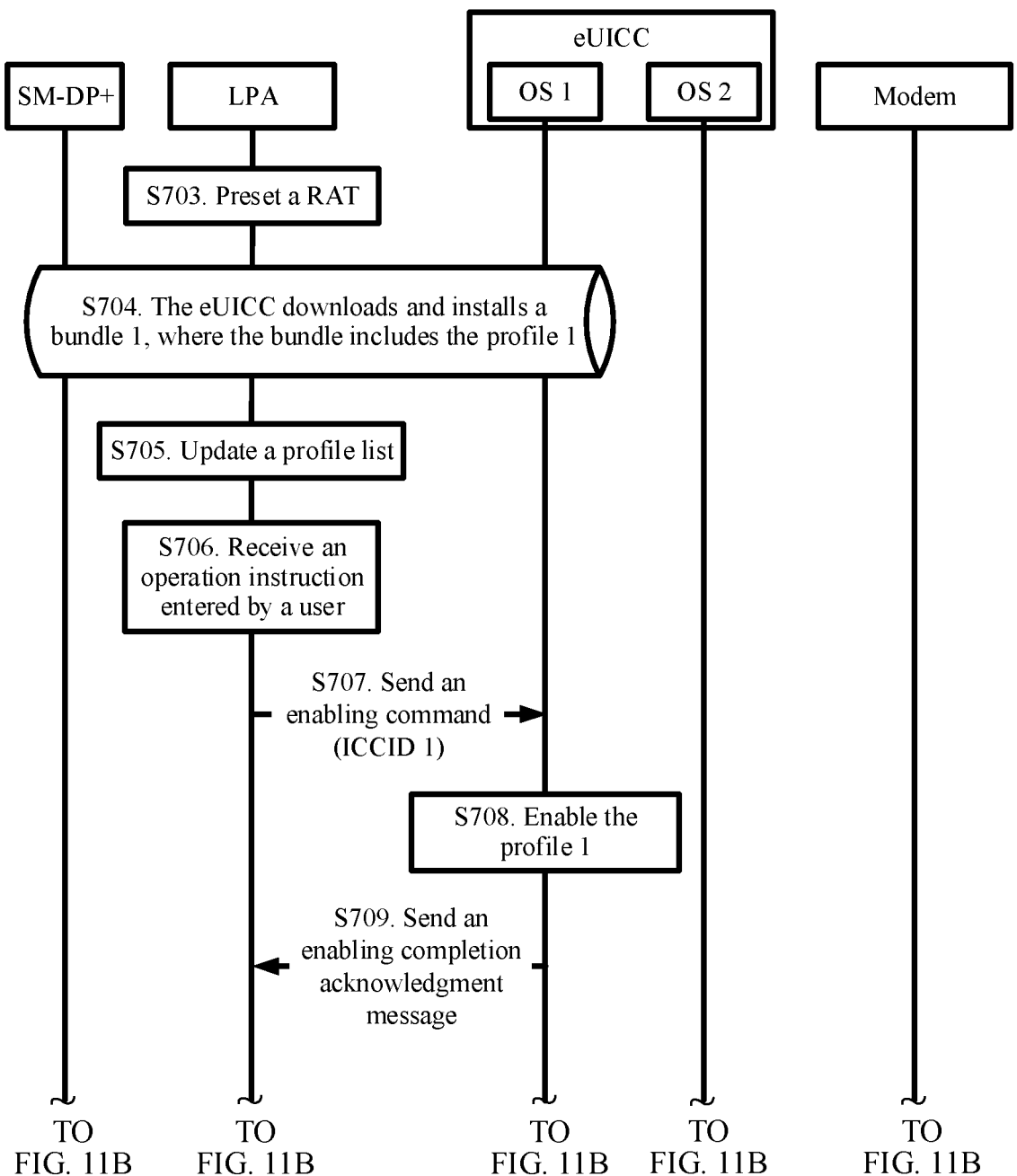
FIG. 11A and FIG. 11B are a flowchart of a method for managing a local profile according to an embodiment of the present subject matter.
Figure 11B:
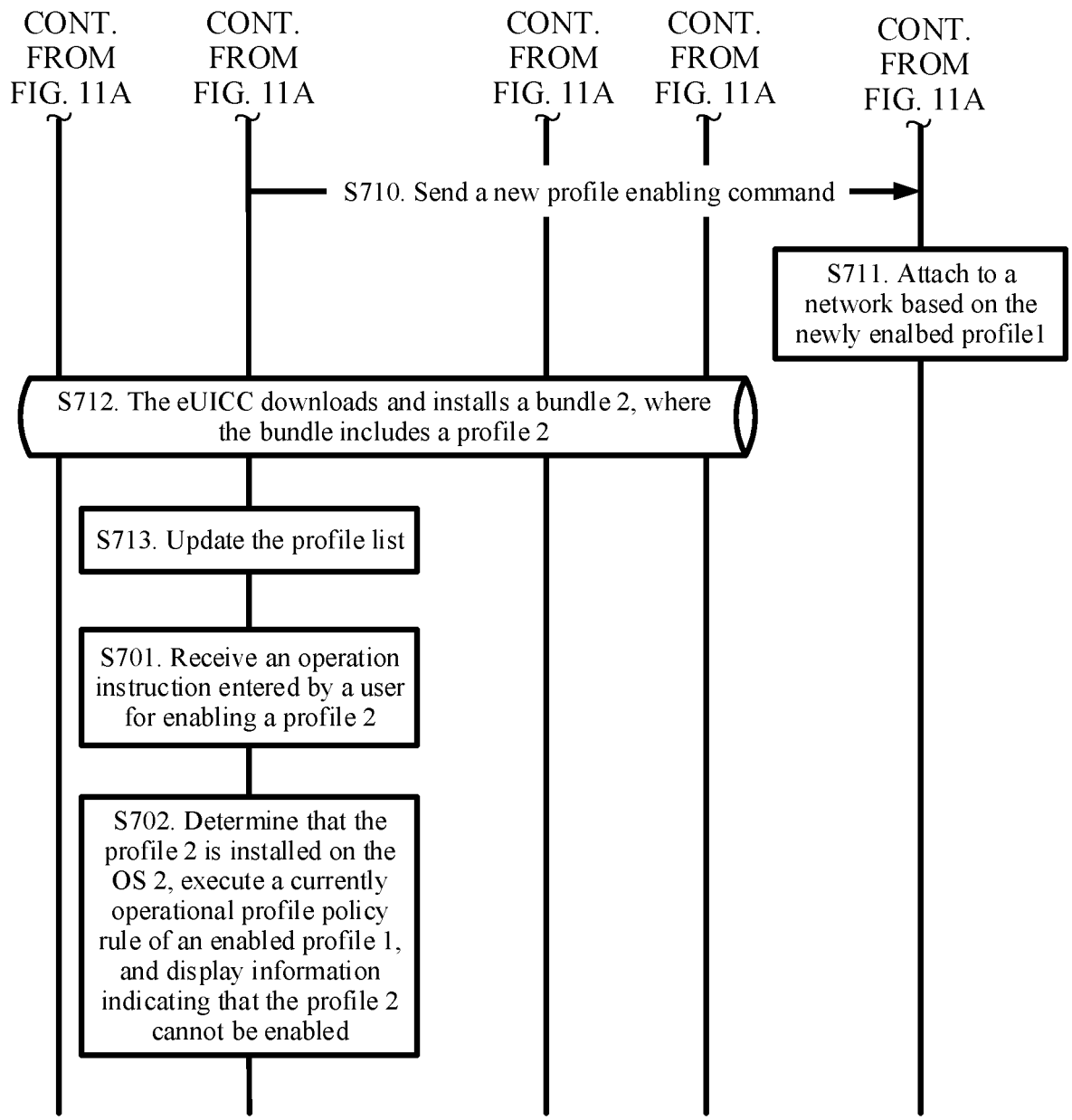

FIG. 11A and FIG. 11B are a flowchart of a method for managing a local profile according to an embodiment of the present subject matter. As shown in FIG. 11A and FIG. 11B, the method may include the following steps.

S701. An LPA receives an operation instruction entered by a user for enabling a first profile.

S702. The LPA determines that the first profile is installed in a first operating system OS, and executes a currently operational profile policy rule PPR of an enabled second profile, and when the PPR does not allow disabling, the LPA displays information indicating that the first profile cannot be enabled.

In this embodiment of the present subject matter, the first profile may be considered as a profile 2 (profile2), the first operating system as an OS 2, and the second profile as a profile 1 (profile1).

In this embodiment of the present subject matter, an eUICC downloads and installs a bundle 1 (image1) and a bundle 2 (image2), updates a profile list based on the bundle 1 and the bundle 2, and enables the profile 1. When receiving an operation instruction entered by a user for enabling the profile 2, the LPA determines a target profile that should be enabled, that is, an OS in which the profile 2 is to be installed. When determining that the profile 2 is installed in the OS 2, a currently running PPR 1 of the profile 1 in the OS 1, and the PPR 1 does not allow disabling, the LPA displays a message indicating that the profile 2 cannot be enabled or switched. In this embodiment of the present subject matter, the currently operational profile 1 is installed in the OS 1.

According to the method provided in this embodiment of the present subject matter, profile switching across OSs is implemented.

Optionally, as shown in FIG. 11A and FIG. 11B, before the receiving, by an LPA, an operation instruction entered by a user for enabling a first profile, the method further includes the following steps.

S703. The LPA presets a RAT.

S704. The eUICC downloads and installs a bundle 1 (image1).

The bundle 1 includes an OS 1 and a profile 1, and the profile 1 includes a PPR 1.

S705. The LPA updates a profile list.

S706. The LPA receives the operation instruction entered by the user.

S707. The LPA sends an enabling command to the OS 1.

The enabling command includes an ICCID 1 corresponding to the profile 1.

S708. The OS 1 enables the profile 1.

S709. The OS 1 sends an enabling completion acknowledgment message to the LPA.

S710. The LPA sends a new profile enabling command to a modem.

S711. The modem attaches to a network based on the newly enabled profile 1.

S712. The eUICC downloads and installs a bundle 2 (image2).

The bundle 2 includes an OS 2 and a profile 2.

S713. The LPA updates the profile list, and then performs S701.

Figure 12:
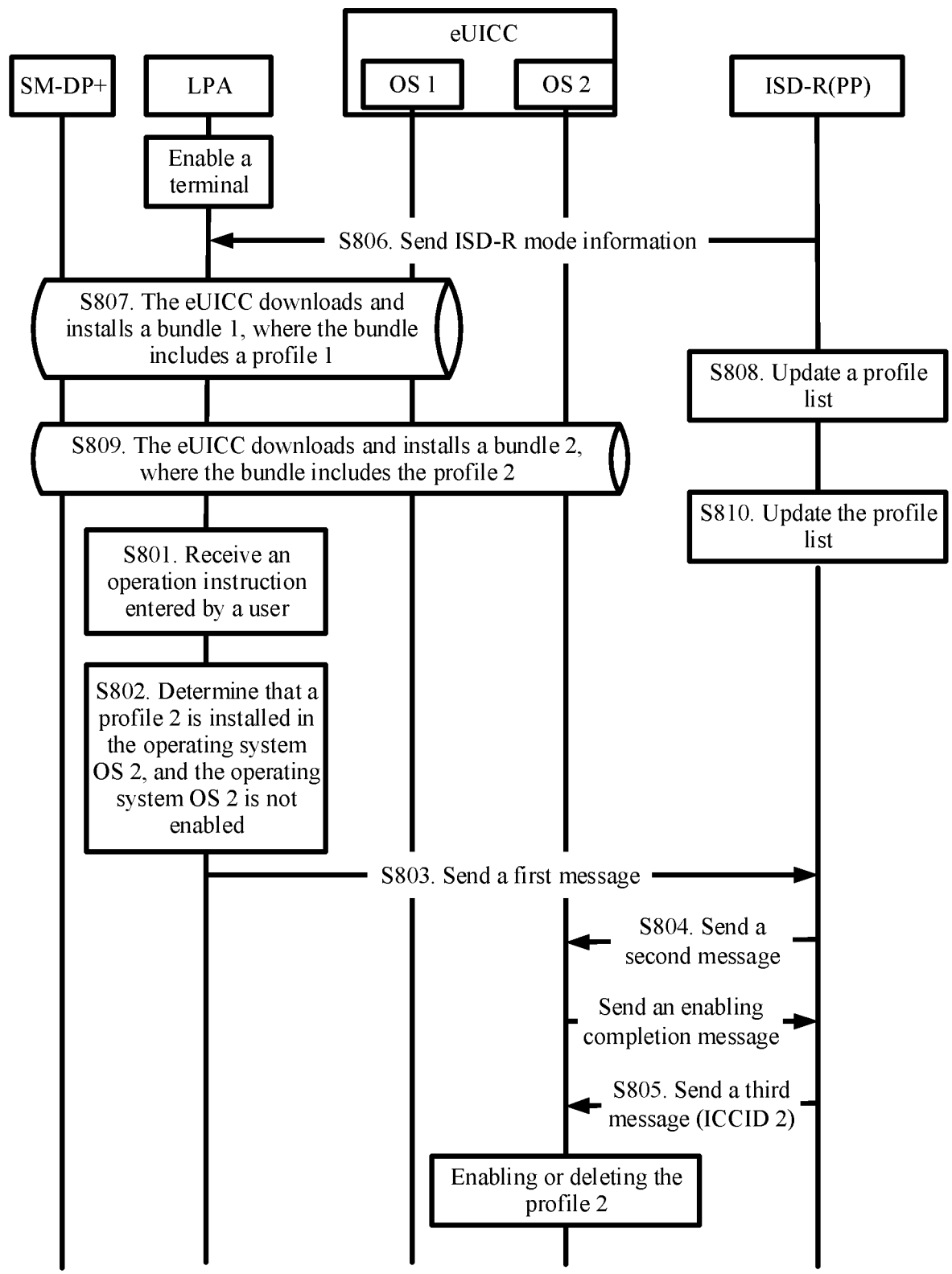
FIG. 12 is a flowchart of another method for managing a local profile according to an embodiment of the present subject matter.

FIG. 12 is a flowchart of another method for managing a profile according to an embodiment of the present subject matter.

In this embodiment of the present subject matter, an ISD-R is provided on a primary platform (Primary Platform) of an eUICC. It should be further noted that in this embodiment of the present subject matter, "first" and "second" are merely used to distinguish between messages, and do not limit the messages.

As shown in FIG. 12, the method may include the following steps.

S801. An LPA receives an operation instruction entered by a user.

In this embodiment of the present subject matter, the operation instruction may be used as an operation instruction for enabling or deleting a profile.

In this embodiment of the present subject matter, enabling or deleting of a profile 2 installed in an OS 2 is used as an example for description.

S802. The LPA determines that the profile 2 is installed in an operating system OS 2, and that the operating system OS 2 is not enabled.

S803. The LPA sends a first message to the ISD-R.

The first message is used by the ISD-R to execute the operation instruction. The first message includes an integrated circuit card identifier ICCID 2 corresponding to the profile and an identifier of the operating system OS 2.

S804. The ISD-R sends a second message to the operating system OS 2.

The second message may be an operating system OS 2 enabling command.

S805. After receiving feedback information sent by the OS 2, the ISD-R sends a third message to the OS 2, where the third message includes the ICCID 2 corresponding to the profile 2, so that the first operating system performs a corresponding operation after receiving the third message.

In this embodiment of the present subject matter, the third message corresponds to the operation instruction, and the third message may be an enabling command for enabling the profile 2, or may be a deletion command for deleting the profile 2.

According to the method in this embodiment of the present subject matter, the ISD-R on the primary platform of the eUICC can implement profile switching across operating systems.

Optionally, as shown in FIG. 12, before the LPA receives the operation instruction entered by the user, the method may further include the following steps.

S806. The LPA receives ISD-R mode information sent by an ISD-R.

S807. An eUICC downloads and installs a bundle 1.

The bundle 1 includes an operating system OS 1 and a profile 1.

S808. The ISD-R updates a profile list.

S809. The eUICC downloads and installs a bundle 2.

The bundle 2 includes an operating system OS 2 and a profile 2.

S810. The ISD-R updates the profile list, and then performs S801.

In this embodiment of the present subject matter, if the operation instruction is an operation instruction for enabling the profile 2, after receiving the third message, the OS 2 enables the profile 2 based on the third message, and sends an enabling completion acknowledgment message to the ISD-R; then the ISD-R sends the enabling completion acknowledgment message to the LPA; and then the LPA sends a new enabling profile message to a modem (modem).

Figure 13:
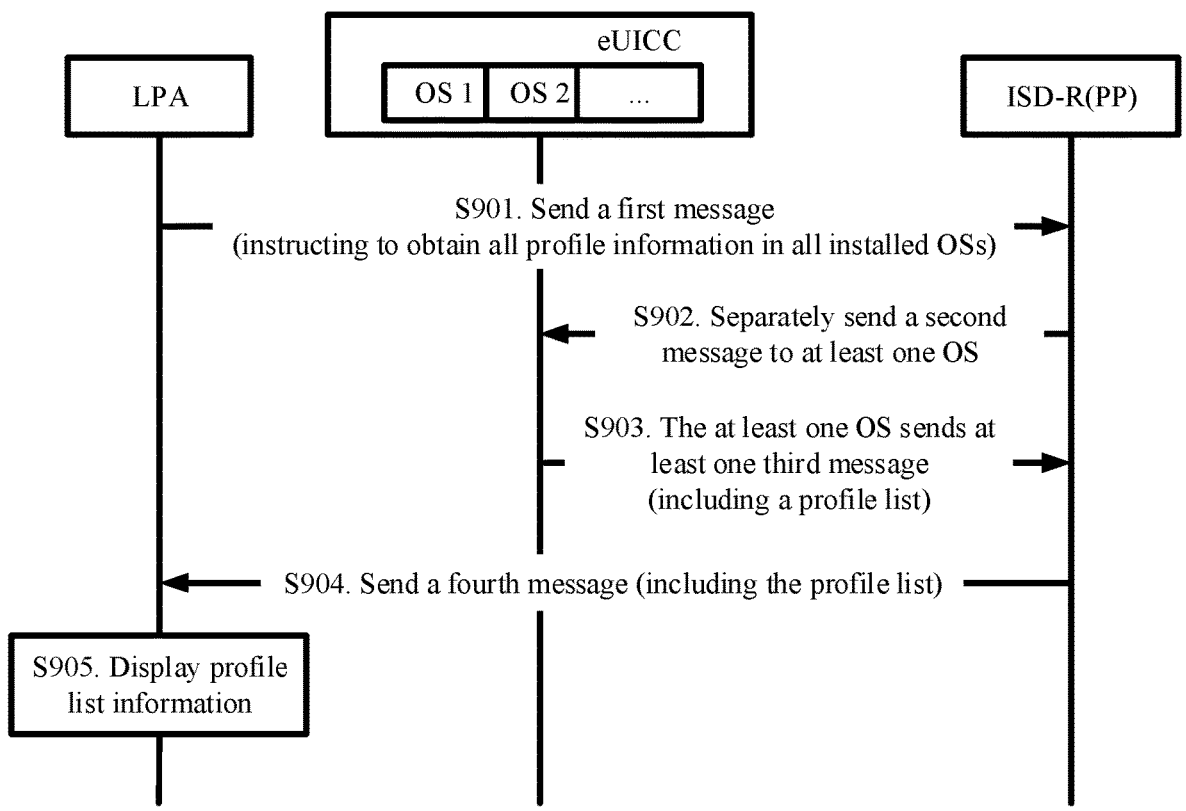
FIG. 13 is a flowchart of a method for managing a profile according to an embodiment of the present subject matter.

FIG. 13 is a flowchart of a method for managing a profile according to an embodiment of the present subject matter.

In this embodiment of the present subject matter, an ISD-R is provided on a primary platform (Primary Platform) of an eUICC. It should be further noted that, in this embodiment of the present subject matter, "first", "second", "third", and "fourth" are merely used to distinguish between information, bundles, or profiles, and do not limit the information, the bundles, or the profiles.

As shown in FIG. 13, the method may include the following steps.

S901. The ISD-R receives a first message sent by an LPA.

The first message includes first indication information, and the first indication information is used to instruct to obtain all profile information (profileinfo) in at least one OS installed in the eUICC.

In this embodiment of the present subject matter, the first message may be profile obtaining information, and the profile obtaining information may include identifiers of all bundles (AllBundles), to obtain information about profiles installed in OSs corresponding to all the bundles.

S902. The ISD-R sends a second message to the at least one OS.

The second message includes second indication information, and the second indication information is information used to instruct to obtain a profile.

After receiving the first message sent by the LPA, the ISD-R sends the second message to all the OSs. The second message may be a profile information obtaining message, to obtain information about a profile installed in a target OS.

S903. The ISD-R receives at least one third message sent by the at least one OS.

The third message includes profile list information.

S904. The ISD-R sends a fourth message to the LPA.

The fourth message includes the profile list information sent by the at least one OS.

S905. The LPA displays the profile list information.

Optionally, in this embodiment of the present subject matter, before the ISD-R receives the first message sent by the LPA, the method may further include the following step:

The ISD-R updates a profile list based on a bundle downloaded and installed by the eUICC. The bundle includes an OS and a profile, and the profile list includes an identifier of the at least one OS and an integrated circuit card identifier ICCID corresponding to a profile installed in the at least one OS.

Optionally, in this embodiment of the present subject matter, before the ISD-R receives the first message sent by the local profile assistant LPA, the method further includes the following step:

The ISD-R sends ISD-R mode information to the LPA.

Figure 14:
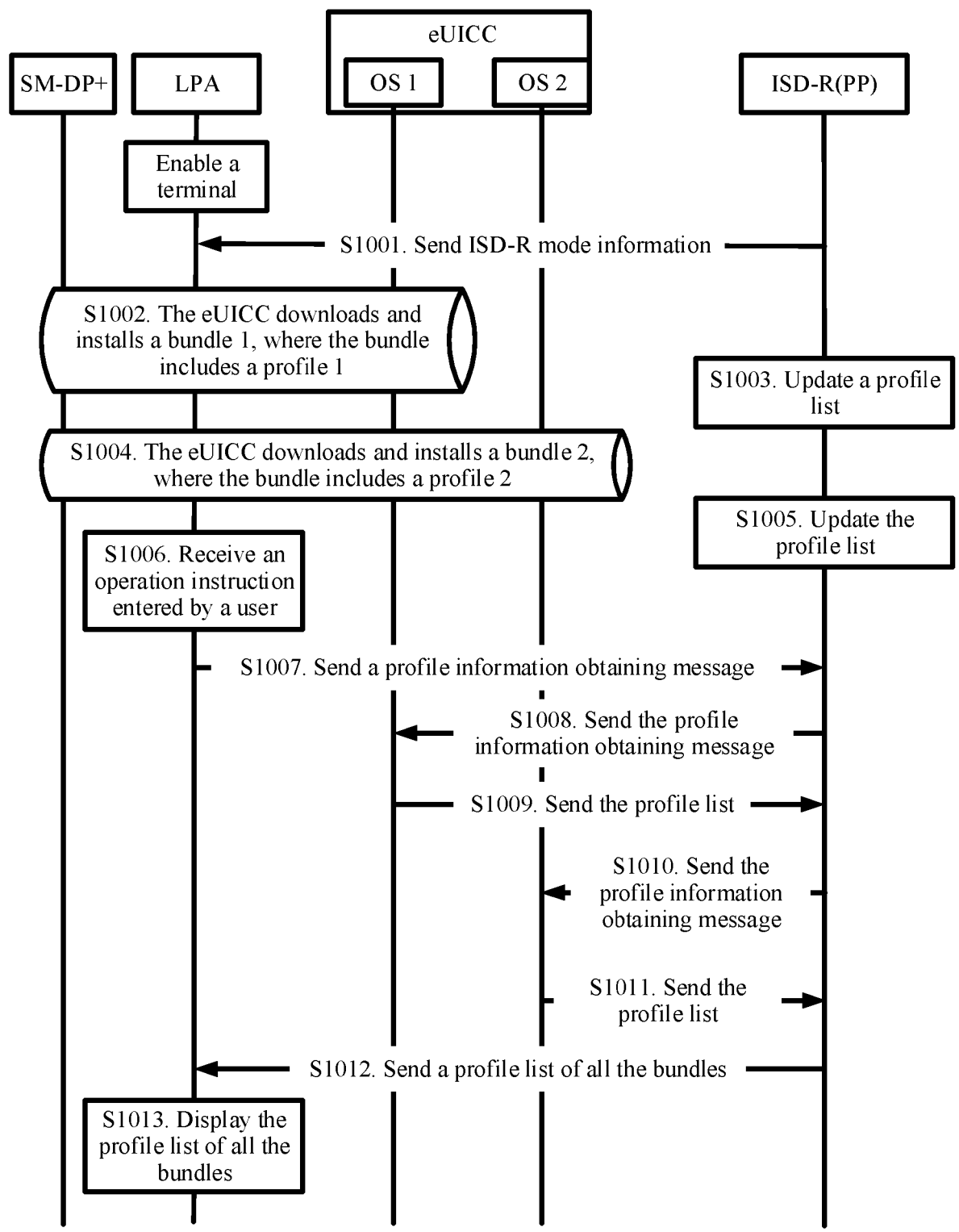
FIG. 14 is a flowchart of a method of management according to an embodiment of the present subject matter.

For example, two bundles, a bundle 1 and a bundle 2, are installed in the eUICC. The bundle 1 includes an OS 1 and a profile 1, and the bundle 2 includes an OS 2 and a profile 2. The method may be specifically shown in FIG. 14. As shown in FIG. 14, the method may specifically be as follows.

S1001. The LPA receives the ISD-R mode information sent by the ISD-R.

S1002. The eUICC downloads and installs the bundle 1 (image1).

The eUICC downloads and installs the bundle 1 from an SM-DP+ server by using the LPA. The bundle 1 includes the OS 1 and the profile 1.

S1003. The ISD-R updates a profile list.

S1004. The eUICC downloads and installs the bundle 2 (image2).

The eUICC downloads and installs the bundle 2 from the SM-DP+ server by using the LPA. The bundle 2 includes the OS 2 and the profile 2.

S1005. The ISD-R updates the profile list.

S1006. The LPA receives an operation instruction entered by a user.

S1007. The LPA sends a profile information obtaining message to the ISD-R.

The profile information obtaining message includes identifiers of all bundles, that is, includes an identifier of the bundle 1 and an identifier of the bundle 2.

S1008. The ISD-R sends the profile information obtaining message to the OS 1.

S1009. The OS 1 sends the profile list to the ISD-R.

S1010. The ISD-R sends the profile information obtaining message to the OS 2.

S1011. The OS 2 sends the profile list to the ISD-R.

S1012. The ISD-R sends a profile list of all the bundles to the LPA.

S1013. The LPA displays the profile list of all the bundles.

According to the solution in this embodiment of the present subject matter, a profile list of a current bundle (List Profile in Current Bundle) may be obtained by an ISD-R provided on a primary platform of the eUICC, or a profile list of all bundles (List Profile in All Bundle) may be obtained.

In another embodiment of the present subject matter, a stored profile list may be directly presented to a user by using the LPA.

Optionally, in another embodiment of the present subject matter, the LPA may include an ISD-R list in at least one OS. When receiving information for obtaining all profiles in the at least one operating system OS installed in the eUICC, the LPA sequentially sends, to ISD-Rs in all the OSs, profile obtaining information GetProfilesInfo, and obtains a list of profiles (List of Profiles) from a corresponding OS.

An embodiment of the present subject matter further provides a method of management used to set or modify a default SM-DP+ server address. A user may download a profile by using an SM-DP+ server in an enabling code, and a terminal pops one piece of prompt information, to prompt the user whether to set an SM-DP+ server address as the default SM-DP+ server address.

The method may include the following steps.

An LPA receives an operation instruction entered by the user for setting the SM-DP+ server address.

The user may perform selection based on displaying of the prompt information about whether to set the SM-DP+ server address as the default SM-DP+ server address, and enter the operation instruction when the user performs selection. When the user chooses, based on the prompt information displayed by the terminal, to set the SM-DP+ server address as the default SM-DP+ server address, and all OSs installed in the eUICC are in an enabled state, the LPA sends, to the at least one OS, an SM-DP+ server address setting message.

The SM-DP+ server address setting message includes the default SM-DP+ server address. When receiving the SM-DP+ server address setting message, each OS sets or modifies a current address SM-DP+ server to the default SM-DP+ server address.

In this scenario, after receiving the operation instruction entered by the user for setting the SM-DP+ server address, the LPA may set or modify the SM-DP+ server address across OSs by using the ISD-R provided on the primary platform of the eUICC.

Figure 15:
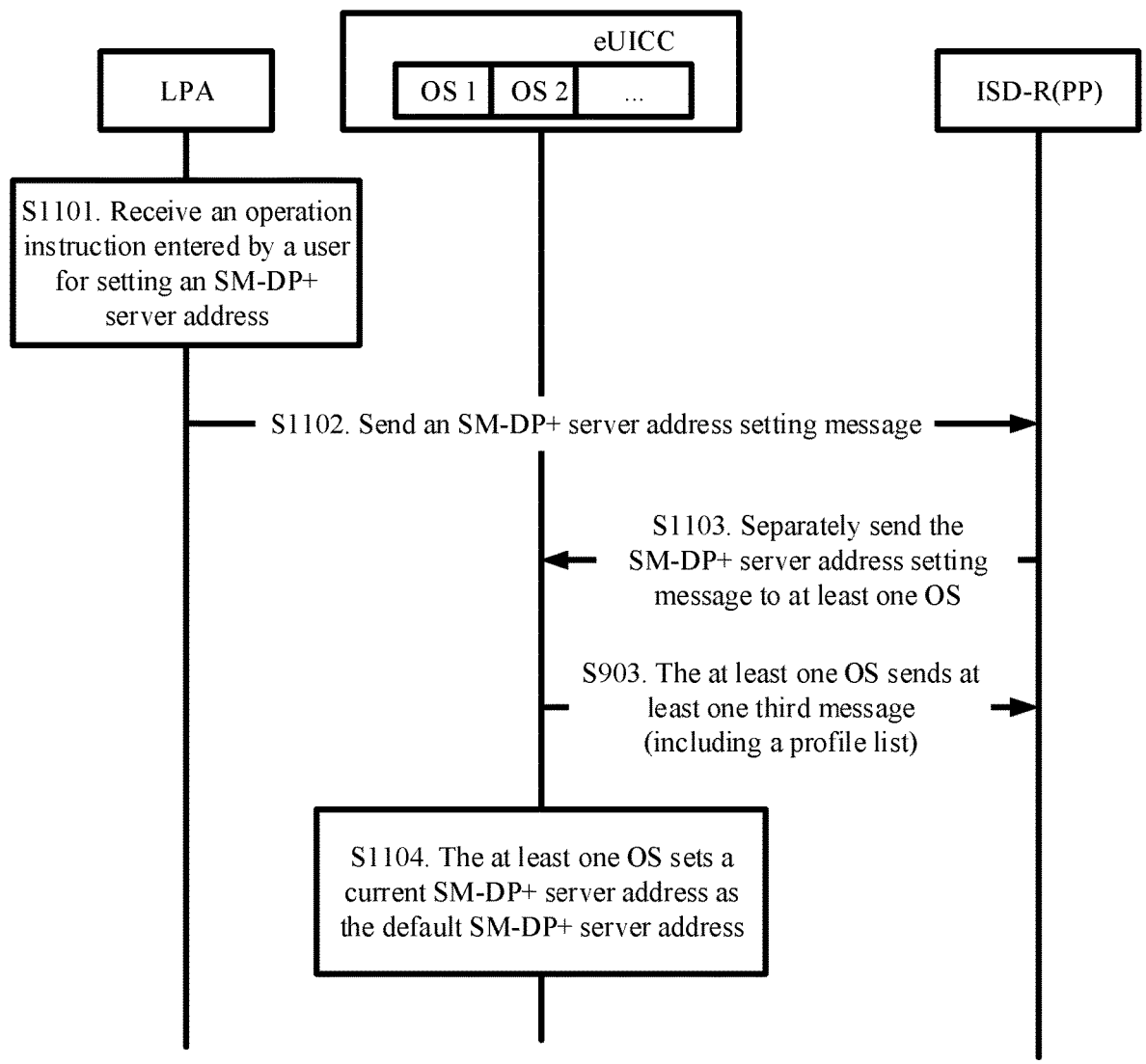
FIG. 15 is a flowchart of another method of management according to an embodiment of the present subject matter.

The following describes an embodiment of the present subject matter with reference to FIG. 15.

FIG. 15 is a flowchart of another method of management according to an embodiment of the present subject matter. As shown in FIG. 15, the method may include the following steps.

1101: An LPA receives an operation instruction entered by a user for setting an SM-DP+ server address.

The user may perform selection based on displaying of prompt information about whether to set the SM-DP+ server address as a default SM-DP+ server address, and enter the operation instruction when the user performs selection. When the user chooses, based on the prompt information displayed by a terminal, to set the SM-DP+ server address as the default SM-DP+ server address, S1102 is performed.

S1102. The LPA sends the SM-DP+ server address setting message to an ISD-R.

The SM-DP+ server address setting message may include an identifier of a bundle and the default SM-DP+ server address.

S1103. The ISD-R separately sends the SM-DP+ server address setting message to at least one OS.

The ISD-R forwards the SM-DP+ server address setting message to all OSs in the bundle corresponding to the identifier of the bundle.

S1104. The at least one OS sets or modifies a current SM-DP+ server address as the default SM-DP+ server address.

It should be noted that, in this embodiment of the present subject matter, the default SM-DP+ server address may be used as a first SM-DP+ server address, and the current SM-DP+ server address may be referred to as a second SM-DP+ server address.

An embodiment of the present subject matter provides an embedded universal integrated circuit card eUICC. The eUICC includes a primary platform and at least one installed bundle, the primary platform is a hardware platform, each bundle includes at least one profile and an operating system OS, the primary platform includes a processing module, and the processing module is configured to: receive a first message sent by a local profile assistant LPA, where the first message is an operation instruction entered by a user; and separately send a second message to at least one OS corresponding to the at least one bundle, where the second message is used by the at least one OS to perform a corresponding operation.

Optionally, in an embodiment of the present subject matter, the first message is a profile enabling command, the first message includes an integrated circuit card identifier ICCID, and the ICCID is used to identify a profile. The second message is a profile policy rule obtaining message.

In this embodiment of the present subject matter, the separately sending a second message to at least one OS corresponding to the at least one bundle includes: sending the second message to an OS in which an enabled profile is located, where the at least one OS includes the OS in which the enabled profile is located; receiving a profile policy rule, sent by the OS, of the enabled profile; executing the profile policy rule according to the profile policy rule and a rule authorization list RAT preset by the processing module; and sending an error message to the LPA when the profile rule does not allow disabling.

Optionally, in an embodiment of the present subject matter, the first message is an eUICC memory reset command, the first message includes first indication information, and the second message includes second indication information. The first indication information is used to instruct to delete an operational profile in the at least one OS from the eUICC, and the second indication information is used to instruct to delete the operational profile. Alternatively, the first indication information is used to instruct to delete a test profile in the at least one OS from the eUICC, and the second indication information is used to instruct to delete the test profile.

Optionally, in an embodiment of the present subject matter, the first message further includes third indication information, and the third indication information is used to instruct to delete the at least one OS. After separately sending the second message to the at least one OS corresponding to the at least one bundle, the processing module is further configured to: separately send a third message to the at least one OS, where the third message includes the third indication information.

Optionally, in an embodiment of the present subject matter, the deleting the at least one OS includes deleting at least one non-default OS or deleting at least one test OS.

Optionally, in an embodiment of the present subject matter, before the receiving a first message sent by a local profile assistant LPA, the processing module is further configured to: update a profile list based on the at least one bundle downloaded and installed by the eUICC, where each bundle includes an OS in the at least one OS and at least one profile, and the profile list includes an identifier of the at least one OS and an ICCID corresponding to the at least one profile installed in the at least one OS.

Optionally, in an embodiment of the present subject matter, before the receiving a first message sent by a local profile assistant LPA, the processing module is further configured to: send ISD-R mode information to the LPA, where the ISD-R mode information is used to instruct the LPA to send the first message to the processing module when the LPA receives the operation instruction entered by the user.

Optionally, in an embodiment of the present subject matter, the processing module is an issuer security domain-root ISD-R.

An embodiment of the present subject matter further provides an embedded universal integrated circuit card eUICC. The eUICC includes a local profile assistant LPA, and the LPA is configured to: receive an operation instruction entered by a user for enabling a first profile; determine that the first profile is installed in a first operating system OS; execute a currently operational profile policy rule PPR of an enabled second profile; and when the PPR does not allow disabling, display, by the LPA, information that the first profile cannot be enabled, where the second profile is installed in a second OS.

Optionally, in an embodiment of the present subject matter, before the receiving an operation instruction entered by a user for enabling a first profile, the LPA eUICC is further configured to: update a profile list based on a first bundle downloaded and installed by the embedded universal integrated circuit card eUICC, where the first bundle includes the first OS and the first profile, and the profile list includes an identifier of at least one OS installed in the eUICC and an integrated circuit card identifier ICCID corresponding to the profile installed in the at least one OS.

Optionally, in an embodiment of the present subject matter, before the receiving an operation instruction entered by a user for enabling a first profile, the LPA eUICC is further configured to: update the profile list based on a second installation bundle downloaded and installed by the embedded universal integrated circuit card eUICC, where the second bundle includes the second OS and the second profile, and the profile list includes the second OS and an integrated circuit card identifier ICCID corresponding to the second profile installed in the second OS; when the LPA receives an operation instruction entered by the user for enabling the second profile, send, by the LPA, a command for enabling the second profile to the second OS, where the command for enabling the profile includes the ICCID corresponding to the second profile; and receive the PPR, sent by the second OS, of the second profile.

An embodiment of the present subject matter further provides an embedded universal integrated circuit card eUICC. The eUICC includes a local profile assistant LPA, a primary platform, and an installed bundle, the primary platform is a hardware platform, the bundle includes a profile and a first operating system OS, the primary platform includes a processing module, and the LPA is configured to: receive an operation instruction entered by a user, where the operation instruction is used to enable or delete a profile; determine that the profile is installed in the first operating system OS and that the first OS is not enabled; and send a first message to the processing module, where the first message is used by the processing module to execute the operation instruction, and the first message includes an identifier of the first OS and an integrated circuit card identifier ICCID corresponding to the profile.

Optionally, in an embodiment of the present subject matter, before the receiving an operation instruction entered by a user, the LPA is further configured to: receive ISD-R mode information sent by the processing module, where the ISD-R mode information is used to instruct the LPA to send the first message to the processing module when the LPA receives the operation instruction entered by the user.

Optionally, in an embodiment of the present subject matter, the processing module is an issuer security domain-root ISD-R.

An embodiment of the present subject matter further provides an embedded universal integrated circuit card eUICC. The eUICC includes a primary platform and a bundle, the primary platform is a hardware platform, the bundle includes a profile and a first operating system OS, the primary platform includes a processing module, and the processing module is configured to: receive a first message sent by a local profile assistant LPA, where the first message includes an identifier of the first operating system OS and an integrated circuit card identifier ICCID corresponding to the profile, and the profile is installed in the first OS; send a second message to an OS corresponding to the identifier of the first OS, where the second message includes a command for enabling the first OS; and after the processing module receives feedback information sent by the first OS, send a third message to the first OS, where the third message includes the ICCID corresponding to the profile.

The first message and the third message are used to enable or delete the profile.

Optionally, in an embodiment of the present subject matter, before the receiving a first message sent by a local profile assistant LPA, the processing module is further configured to: update a profile list based on a bundle downloaded and installed by the eUICC, where the bundle includes the first OS and the profile.

Optionally, in an embodiment of the present subject matter, the processing module is further configured to: send ISD-R mode information to the LPA, where the ISD-R mode information is used to instruct the LPA to send the first message to the processing module when the LPA receives an operation instruction entered by a user.

Optionally, in an embodiment of the present subject matter, the processing module is an issuer security domain-root ISD-R.

An embodiment of the present subject matter further provides an embedded universal integrated circuit card eUICC. The eUICC includes a primary platform and at least one installed bundle, the primary platform is a hardware platform, each bundle includes at least one profile and an operating system OS, the primary platform includes a processing module, and the processing module is configured to: receive a first message sent by a local profile assistant LPA, where the first message includes first indication information, and the first indication information is used to instruct to obtain all profile information in at least one OS corresponding to the at least one bundle installed in the eUICC; send a second message to the at least one OS, where the second message includes second indication information, and the second indication information is used to instruct to obtain the profile information; receive at least one third message sent by the at least one OS, where the third message includes profile list information; and send a fourth message to the LPA, where the fourth message includes the profile list information sent by the at least one OS.

Optionally, in an embodiment of the present subject matter, before the receiving a first message sent by a local profile assistant LPA, the processing module is further configured to: update a profile list based on a bundle downloaded and installed by the eUICC, where the bundle includes the at least one OS and a profile installed in the at least one OS, and the profile list includes an identifier of the at least one OS and an integrated circuit card identifier ICCID corresponding to the profile installed in the at least one OS.

Optionally, in an embodiment of the present subject matter, before the receiving a first message sent by a local profile assistant LPA, the processing module is further configured to: send ISD-R mode information to the LPA, where the ISD-R mode information is used to instruct the LPA to send the first message to the primary platform when the LPA receives an operation instruction entered by a user.

Optionally, in an embodiment of the present subject matter, the processing module is an issuer security domain-root ISD-R.

FIG. 6 to FIG. 15 describe methods for managing a local profile. The following describes an eUICC and a terminal provided in the embodiments of the present subject matter with reference to FIG. 16 to FIG. 19.

Figure 16:
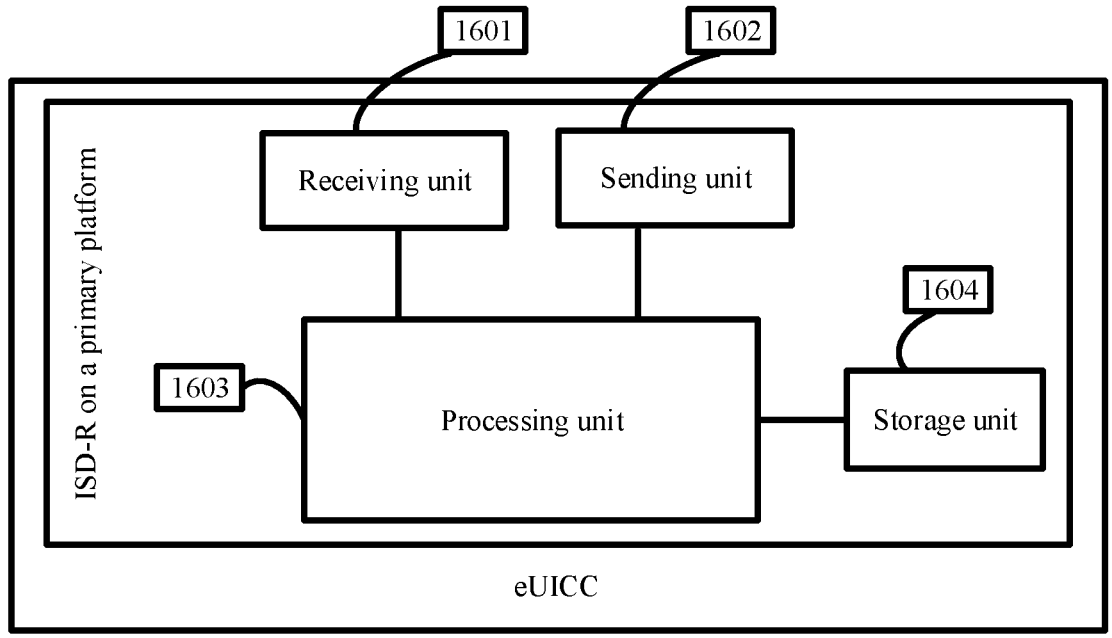
FIG. 16 is a schematic structural diagram of an eUICC according to an embodiment of the present subject matter.

FIG. 16 is a schematic structural diagram of an eUICC according to an embodiment of the present subject matter. As shown in FIG. 16, the eUICC includes a primary platform, the primary platform is a hardware platform, the primary platform includes a processing module, and the processing module includes a receiving unit 1601 and a sending unit 1602.

The receiving unit 1601 is configured to receive a first message sent by an LPA, where the first message is an operation instruction entered by a user.

The sending unit 1602 is configured to separately send a second message to at least one operating system OS installed in the eUICC, where the second message is used to instruct the at least one OS to perform a corresponding operation.

Optionally, in this embodiment of the present subject matter, the processing module may be an issuer security domain-root ISD-R.

The eUICC provided in this embodiment of the present subject matter implements local management of profiles between different OSs by providing the ISD-R on the primary platform of the eUICC.

Optionally, in this embodiment of the present subject matter, the first message is a profile enabling command, the first message includes an integrated circuit card identifier ICCID, and the ICCID is used to identify a profile. The second message is a profile policy rule obtaining message.

Optionally, in this embodiment of the present subject matter, the processing module further includes a processing unit 1603. That the sending unit 1602 is configured to separately send a second message to at least one operating system OS installed in the eUICC includes the following steps:

The sending unit 1602 sends the second message to an OS in which an enabled profile is located, where the at least one OS includes the OS in which the enabled profile is located.

The receiving unit 1601 receives a profile policy rule, sent by the OS, of the enabled profile.

The processing unit 1603 is configured to: execute the profile policy rule according to the profile policy rule and a rule authorization list RAT preset by the processing module.

When the profile rule does not allow disabling, the sending unit 1602 sends an error message to the LPA.

Optionally, in another embodiment of the present subject matter, the first message is an eUICC memory reset command, the first message includes first indication information, and the second message includes second indication information. The first indication information is used to instruct to delete an operational profile in the at least one OS from the eUICC, and the second indication information is used to instruct to delete the operational profile. Alternatively, the first indication information is used to instruct to delete a test profile in the at least one OS from the eUICC, and the second indication information is used to instruct to delete the test profile.

Optionally, in this embodiment of the present subject matter, the first message further includes third indication information, and the third indication information is used to instruct to delete the at least one OS.

The sending unit 1602 is further configured to separately send a third message to the at least one OS, where the third message includes the third indication information.

Optionally, in this embodiment of the present subject matter, the deleting the at least one OS includes deleting at least one non-default OS or deleting at least one test OS.

Optionally, in an embodiment of the present subject matter, the processing unit 1603 of the processing module updates a profile list based on the at least one bundle downloaded and installed by the eUICC. Each bundle includes an OS in the at least one OS and at least one profile, and the profile list includes an identifier of the at least one OS and an ICCID corresponding to the at least one profile installed in the at least one OS.

Optionally, in this embodiment of the present subject matter, the sending unit 1602 is further configured to send ISD-R mode (mode) information to the LPA, where the ISD-R mode information is used to instruct the LPA to send the first message to the processing module when the LPA receives the operation instruction entered by the user.

Optionally, in this embodiment of the present subject matter, the processing module may further include a storage unit 1604, configured to store an instruction, and perform a corresponding operation when the processing unit 1603 invokes the instruction in the storage unit.

Functions of functional units of the processing module disposed on the primary platform of the eUICC may be implemented by using steps performed by the ISD-R in the embodiments shown in FIG. 6 to FIG. 10B. Therefore, a specific working process of the ISD-R provided in this embodiment of the present subject matter is not described herein again.

Figure 17:
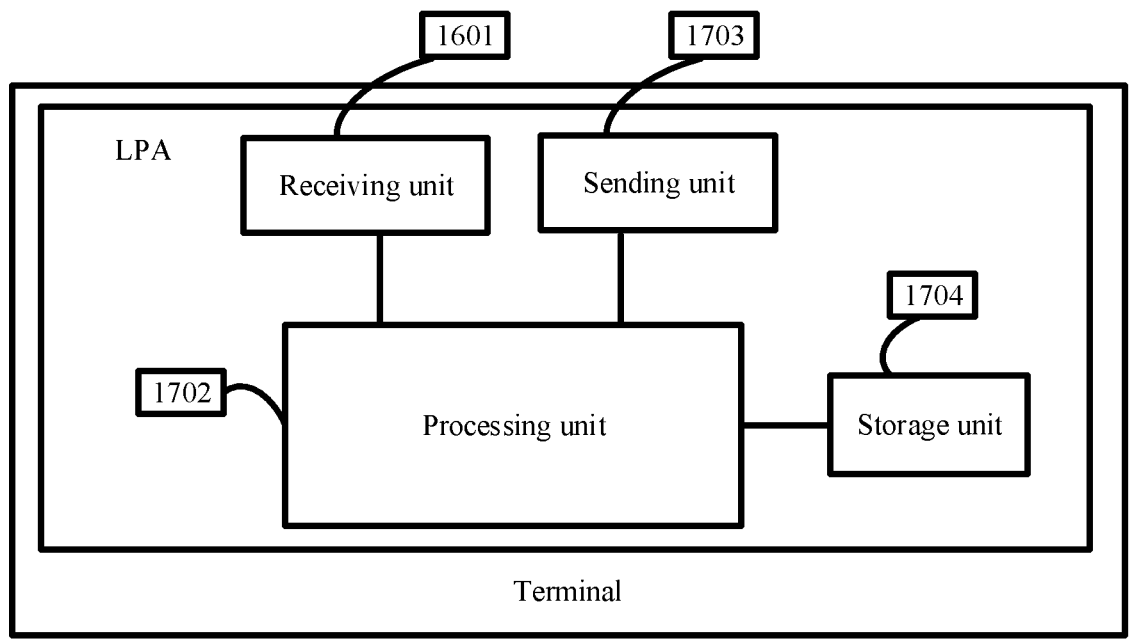
FIG. 17 is a schematic structural diagram of a terminal according to an embodiment of the present subject matter.

FIG. 17 is a schematic structural diagram of a terminal according to an embodiment of the present subject matter. As shown in FIG. 17, the terminal includes a local profile assistant LPA, and the LPA may include a receiving unit 1701 and a processing unit 1702.

The receiving unit 1701 is configured to receive an operation instruction entered by a user for enabling a first profile, The processing unit 1702 is configured to: determine that the first profile is installed in a first operating system OS; execute a currently operational profile policy rule PPR of an enabled second profile; and when the PPR does not allow disabling, display, by the LPA, information indicating that the first profile cannot be enabled.

According to the terminal provided in this embodiment of the present subject matter, the LPA in the terminal can implement a function of executing the PPR, and enable profiles of different OSs.

Optionally, in an embodiment of the present subject matter, the processing unit 1702 is further configured to update a profile list based on a first bundle downloaded and installed by an eUICC. The first bundle includes the first OS and the first profile. The profile list includes an identifier of at least one OS installed in the eUICC and an integrated circuit card identifier ICCID corresponding to a profile installed in the at least one OS.

Optionally, in this embodiment of the present subject matter, the LPA further includes a sending unit 1703.

The processing unit 1702 is further configured to update a profile list based on a second installation bundle downloaded and installed by the embedded universal integrated circuit card eUICC. The second bundle includes the second OS and the second profile, and the profile list includes the second OS and an integrated circuit card identifier ICCID corresponding to the second profile installed in the second OS.

When the receiving unit receives an operation instruction entered by the user for enabling the second profile, the sending unit 1703 sends a command for enabling the second profile to the second OS, where the command for enabling the profile includes the ICCID corresponding to the second profile.

The receiving unit 1701 receives the PPR, sent by the second OS, of the second profile.

Optionally, in this embodiment of the present subject matter, the LPA may further include a storage unit 1704, configured to store an instruction, and perform a corresponding operation when the processing unit 1702 invokes the instruction in the storage unit.

Functions of functional units of the LPA in the terminal may be implemented by using steps performed by the LPA in the embodiment shown in FIG. 11A and FIG. 11B. Therefore, a specific working process of the LPA provided in this embodiment of the present subject matter is not described herein again.

An embodiment of the present subject matter further provides a terminal. For a schematic structural diagram of the terminal, refer to FIG. 17. The terminal includes a local profile assistant LPA and an embedded universal integrated circuit card eUICC, a primary platform of the eUICC includes a processing module, the primary platform is a hardware platform, and the LPA may include: a receiving unit 1701, configured to receive an operation instruction entered by a user, where the operation instruction is used to enable or delete a profile; a processing unit 1702, configured to determine that the profile is installed in a first operating system OS and that the first OS is not enabled; and a sending unit 1703, configured to send a first message to the processing module, where the first message is used by the processing module to execute the operation instruction, and the first message includes an identifier of the first OS and an integrated circuit card identifier ICCID corresponding to the profile.

Optionally, in this embodiment of the present subject matter, the processing module may be an issuer security domain-root ISD-R.

The terminal provided in this embodiment implements enabling or deleting of profiles across OSs, and implements local management of profiles across OSs, by providing an ISD-R is provided on the primary platform of the eUICC.

Optionally, in this embodiment of the present subject matter, the receiving unit 1701 is further configured to receive ISD-R mode information sent by the processing module, where the ISD-R mode information is used to instruct the LPA to send the first message to the processing module when the LPA receives the operation instruction entered by the user.

Functions of functional units of the LPA in the terminal may be implemented by using steps performed by the LPA in the embodiment shown in FIG. 12. Therefore, a specific working process of the LPA provided in this embodiment of the present subject matter is not described herein again.

An embodiment of the present subject matter further provides an eUICC. For a structure of the eUICC, refer to the schematic structural diagram of the eUICC shown in FIG. 16. A primary platform of the eUICC includes a processing module, the primary platform is a hardware platform, and the processing module may include: a receiving unit 1601, configured to receive a first message sent by an LPA, where the first message includes an identifier of a first operating system OS and an integrated circuit card identifier ICCID corresponding to a profile, and the profile is installed in the first OS; and a sending unit 1602, configured to send a second message to an OS corresponding to the identifier of the first OS, where the second message includes a command for enabling the first OS.

After the receiving unit 1601 receives feedback information sent by the first OS, the sending unit 1602 sends a third message to the first OS, where the third message includes the ICCID corresponding to the profile.

The first message and the third message are used to enable or delete the profile.

Optionally, in this embodiment of the present subject matter, the processing module may be an issuer security domain-root ISD-R.

The eUICC provided in this embodiment of the present subject matter enables or deletes of profiles across OSs by setting the ISD-R on the primary platform.

Optionally, in this embodiment of the present subject matter, a processing unit 1603 is configured to update a profile list based on a bundle downloaded and installed by the eUICC, where the bundle includes the first OS and the profile.

Optionally, in this embodiment of the present subject matter, the sending unit 1602 is further configured to send ISD-R mode information to the LPA, where the ISD-R mode information is used to instruct the LPA to send the first message to the processing module when the LPA receives an operation instruction entered by a user.

Functions of functional units of the processing module disposed on the primary platform of the eUICC may be implemented by using steps performed by the ISD-R in the embodiment shown in FIG. 12. Therefore, a specific working process of the ISD-R provided in this embodiment of the present subject matter is not described herein again.

An embodiment of the present subject matter further provides an embedded universal integrated circuit card eUICC. As shown in FIG. 16, a primary platform of the eUICC includes a processing module, the primary platform is a hardware platform, and the processing module may include: a receiving unit 1601, configured to receive a first message sent by an LPA, where the first message includes first indication information, and the first indication information is used to instruct to obtain all profile information in at least one operating system OS installed in the eUICC; and a sending unit 1602, configured to send a second message to the at least one OS, where the second message includes second indication information, and the second indication information is used to instruct to obtain the profile information.

The receiving unit 1601 is further configured to receive at least one third message sent by the at least one OS, where the third message includes profile list information.

The sending unit 1602 is further configured to send a fourth message to the LPA, where the fourth message includes the profile list information sent by the at least one OS.

Optionally, in this embodiment of the present subject matter, the processing unit 1603 is configured to update a profile list based on a bundle downloaded and installed by the eUICC, where the bundle includes the at least one OS and a profile installed in the at least one OS, and the profile list includes an identifier of the at least one OS and an integrated circuit card identifier ICCID corresponding to the profile installed in the at least one OS.

Optionally, in this embodiment of the present subject matter, the sending unit 1602 is further configured to send processing module mode information to the LPA, where the ISD-R mode information is used to instruct the LPA to send the first message to the ISD-R when the LPA receives an operation instruction entered by a user.

Optionally, in this embodiment of the present subject matter, the processing module may be an issuer security domain-root ISD-R.

Functions of functional units of the processing module disposed on the primary platform of the eUICC may be implemented by using steps performed by the ISD-R in the embodiment shown in FIG. 13. Therefore, a specific working process of the ISD-R provided in this embodiment of the present subject matter is not described herein again.

In this embodiment of the present subject matter, the LPA of the terminal in FIG. 17 may further perform the methods/steps performed by the LPA in the method of management shown in FIG. 14. For brevity of description, details are not described herein again.

In this embodiment of the present subject matter, the processing module of the eUICC in FIG. 16 may further perform the methods/steps performed by the ISD-R in the method of management shown in FIG. 15. For brevity of description, details are not described herein again.

Figure 18:
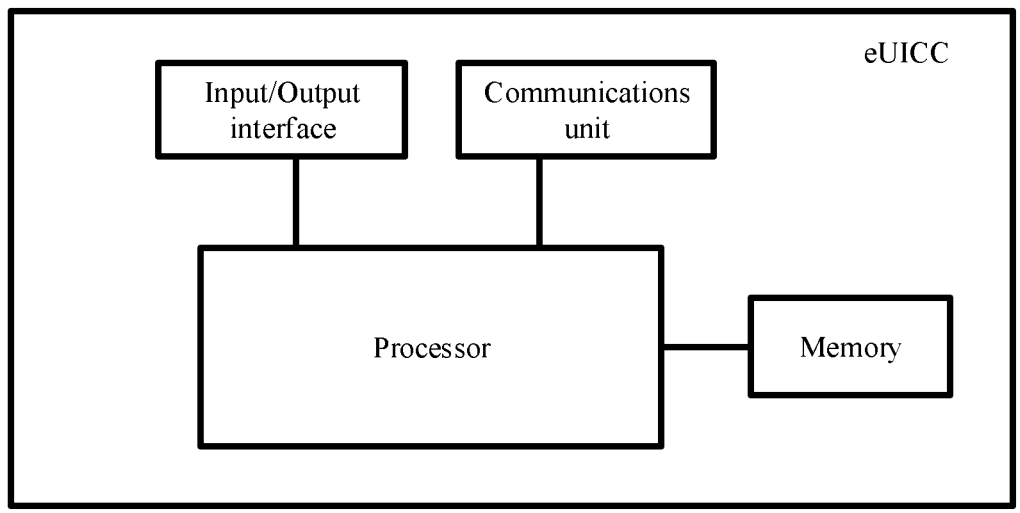
FIG. 18 is a schematic structural diagram of another eUICC according to an embodiment of the present subject matter.

FIG. 18 is a schematic structural diagram of another eUICC according to an embodiment of the present subject matter. As shown in FIG. 18, the eUICC may include a memory, a processor, and a computer program that is stored in the memory and that can be run on the processor. When executing a program, the processor performs the following steps: receiving a first message sent by a local profile assistant LPA, where the first message is an operation instruction entered by a user; and separately sending a second message to at least one operating system OS installed in the eUICC, where the second message is used to instruct the at least one OS to perform a corresponding operation.

Optionally, in an embodiment of the present subject matter, the first message is a profile enabling command, the first message includes an integrated circuit card identifier ICCID, and the ICCID is used to identify a profile. The second message is a profile policy rule obtaining message.

Optionally, in this embodiment of the present subject matter, the separately sending a second message to at least one OS installed in the eUICC includes: sending the second message to an OS in which an enabled profile is located, where the at least one OS includes the OS in which the enabled profile is located; receiving a profile policy rule, sent by the OS, of the enabled profile; executing the profile policy rule according to the profile policy rule and a rule authorization list RAT preset by an ISD-R; and sending an error message to the LPA when the profile rule does not allow disabling.

Optionally, in another embodiment of the present subject matter, the first message is an eUICC memory reset command, the first message includes first indication information, and the second message includes second indication information. The first indication information is used to instruct to delete an operational profile in the at least one OS from the eUICC, and the second indication information is used to instruct to delete the operational profile. Alternatively, the first indication information is used to instruct to delete a test profile in the at least one OS from the eUICC, and the second indication information is used to instruct to delete the test profile.

Optionally, in an embodiment of the present subject matter, the first message further includes third indication information, and the third indication information is used to instruct to delete the at least one OS. After separately sending the second message to the at least one OS corresponding to at least one bundle, the processor is further configured to: separately send a third message to the at least one OS, where the third message includes the third indication information.

Optionally, in this embodiment of the present subject matter, the deleting the at least one OS includes deleting at least one non-default OS or deleting at least one test OS.

Optionally, in an embodiment of the present subject matter, before the ISD-R receives the first message sent by the local profile assistant LPA, the processor is further configured to: update a profile list based on the at least one bundle downloaded and installed by the eUICC, where each bundle includes an OS in the at least one OS and at least one profile, and the profile list includes an identifier of the at least one OS and an ICCID corresponding to the at least one profile installed in the at least one OS.

Optionally, in an embodiment of the present subject matter, before the ISD-R receives the first message sent by the local profile assistant LPA, the processor is further configured to: send ISD-R mode information to the LPA, where the ISD-R mode information is used to instruct the LPA to send the first message to the ISD-R when the LPA receives the operation instruction entered by the user.

In this embodiment of the present subject matter, as shown in FIG. 18, the eUICC may further include components such as a communications unit and an input/output interface that communicate with another apparatus.

For problem-resolving implementations and beneficial effects of the components of the eUICC in the foregoing embodiments, refer to the method implementations and the beneficial effects shown in FIG. 6 to FIG. 10B, and therefore details are not described herein again.

Figure 19:
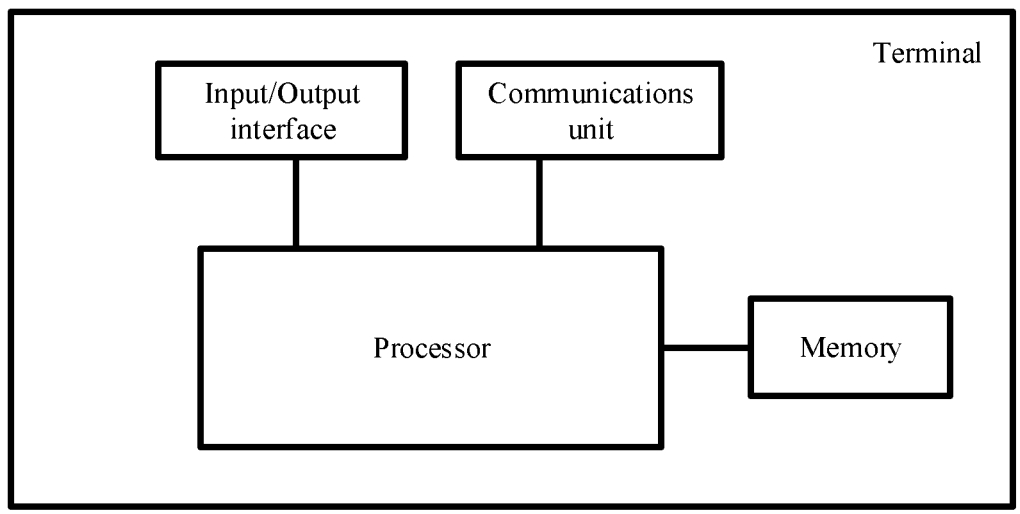
FIG. 19 is a schematic structural diagram of another terminal according to an embodiment of the present subject matter.

FIG. 19 is a schematic structural diagram of another terminal according to an embodiment of the present subject matter. As shown in FIG. 19, the terminal may include a memory, a processor, and a computer program that is stored in the memory and that can be run on the processor. When executing a program, the processor performs the following steps: receiving an operation instruction entered by a user for enabling a first profile; and determining that the first profile is installed in a first operating system OS, executing a currently operational profile policy rule PPR for an enabled second profile, and when the PPR does not allow disabling, displaying, by an LPA, information indicating that the first profile cannot be enabled.

Optionally, in an embodiment of the present subject matter, before receiving the operation instruction entered by the user for enabling the first profile, the processor is further configured to: update a profile list based on a first bundle downloaded and installed by an embedded universal integrated circuit card eUICC, where the first bundle includes the first OS and the first profile; and the profile list includes an identifier of at least one OS installed in the eUICC and an integrated circuit card identifier ICCID corresponding to a profile installed in the at least one OS.

Optionally, in an embodiment of the present subject matter, before receiving the operation instruction entered by the user for enabling the first profile, the processor is further configured to: update the profile list based on a second installation bundle downloaded and installed by the embedded universal integrated circuit card eUICC, where the second bundle includes a second OS and the second profile, and the profile list includes the second OS and an integrated circuit card identifier ICCID corresponding to the second profile installed in the second OS; when the LPA receives an operation instruction entered by the user for enabling the second profile, send, by the LPA, a command for enabling the second profile to the second OS, where the command for enabling the profile includes the ICCID corresponding to the second profile; and receive the PPR, sent by the second OS, of the second profile.

In this embodiment of the present subject matter, as shown in FIG. 19, the terminal may further include components such as a communications unit and an input/output interface that communicate with another apparatus.

For problem-resolving implementations and beneficial effects of the components of the terminal in the foregoing embodiments, refer to the method implementations and the beneficial effects shown in FIG. 11A and FIG. 11B, and therefore details are not described herein again.

An embodiment of the present subject matter further provides a terminal. For a schematic structural diagram of the terminal, refer to the schematic structural diagram of the terminal shown in FIG. 19. The terminal includes a memory, a processor, and a computer program that is stored in the memory and that can be run on the processor. When executing the program, the processor performs the following steps: receiving an operation instruction entered by a user, where the operation instruction is used to enable or delete a profile; determining that the profile is installed in a first operating system OS and that the first OS is not enabled; and sending a first message to an ISD-R, where the first message is used by an ISD-R to execute the operation instruction, and the first message includes an identifier of the first OS and an integrated circuit card identifier ICCID corresponding to the profile.

Optionally, in this embodiment of the present subject matter, before receiving the operation instruction entered by the user, the processor is further configured to: receive ISD-R mode information sent by the ISD-R, where the ISD-R mode information is used to instruct an LPA to send the first message to the ISD-R when the LPA receives the operation instruction entered by the user.

In this embodiment of the present subject matter, the ISD-R may also be referred to as another name, for example, a processing module.

For problem-resolving implementations and beneficial effects of the components of the terminal in the foregoing embodiments, refer to the method implementations and the beneficial effects shown in FIG. 12, and therefore details are not described herein again.

An embodiment of the present subject matter further provides an embedded universal integrated circuit card eUICC. For a schematic structural diagram of the eUICC, refer to the schematic structural diagram of the eUICC shown in FIG. 18. The eUICC includes a memory, a processor, and a computer program that is stored in the memory and that can be run on the processor. When executing the program, the processor performs the following steps: receiving a first message sent by a local profile assistant LPA, where the first message includes an identifier of a first operating system OS and an integrated circuit card identifier ICCID corresponding to a profile, and the profile is installed in the first OS; sending, by an ISD-R, a second message to an OS corresponding to the identifier of the first OS, where the second message includes a command for enabling the first OS; and sending, by the ISD-R, a third message to the first OS after receiving feedback information sent by the first OS, where the third message includes the ICCID corresponding to the profile.

The first message and the third message are used to enable or delete the profile.

Optionally, in this embodiment of the present subject matter, before receiving the first message sent by the local profile assistant LPA, the processor is further configured to: update a profile list based on a bundle downloaded and installed by the eUICC, where the bundle includes the first OS and the profile.

Optionally, in this embodiment of the present subject matter, the processor is further configured to: send ISD-R mode information to the LPA, where the ISD-R mode information is used to instruct the LPA to send the first message to the ISD-R when the LPA receives an operation instruction entered by a user.

In this embodiment of the present subject matter, the ISD-R may also be referred to as another name, for example, a processing module.

For problem-resolving implementations and beneficial effects of the components of the eUICC in the foregoing embodiments, refer to the method implementations and the beneficial effects shown in FIG. 12, and therefore details are not described herein again.

An embodiment of the present subject matter further provides an embedded universal integrated circuit card eUICC. For a schematic structural diagram of the eUICC, refer to the schematic structural diagram of the eUICC shown in FIG. 18. The eUICC includes a memory, a processor, and a computer program that is stored in the memory and that can be run on the processor. When executing the program, the processor performs the following steps: receiving a first message sent by a local profile assistant LPA, where the first message includes first indication information, and the first indication information is used to instruct to obtain all profile information in at least one operating system OS installed in the eUICC; sending, by an ISD-R, a second message to the at least one OS, where the second message includes second indication information, and the second indication information is used to instruct to obtain the profile information; receiving, by the ISD-R, at least one third message sent by the at least one OS, where the third message includes profile list information; and sending, by the ISD-R, a fourth message to the LPA, where the fourth message includes the profile list information sent by the at least one OS.

Optionally, in this embodiment of the present subject matter, before receiving the first message sent by the local profile assistant LPA, the processor is further configured to: update a profile list based on a bundle downloaded and installed by the eUICC, where the bundle includes the at least one OS and a profile installed in the at least one OS, and the profile list includes an identifier of the at least one OS and an integrated circuit card identifier ICCID corresponding to the profile installed in the at least one OS.

Optionally, in this embodiment of the present subject matter, before receiving the first message sent by the local profile assistant LPA, the processor is further configured to: send ISD-R mode information to the LPA, where the ISD-R mode information is used to instruct the LPA to send the first message to the ISD-R when the LPA receives an operation instruction entered by a user.

In this embodiment of the present subject matter, the ISD-R may also be referred to as another name, for example, a processing module.

For problem-resolving implementations and beneficial effects of the components of the eUICC in the foregoing embodiments, refer to the method implementations and the beneficial effects shown in FIG. 13, and therefore details are not described herein again.

An embodiment of the present subject matter further provides a computer-readable storage medium, including an instruction. When the instruction is run on a device, the device is enabled to perform the methods/steps in FIG. 6 to FIG. 15.

An embodiment of the present subject matter further provides a computer program product including an instruction. When the instruction is run on a computer, the computer is enabled to perform the methods/steps in FIG. 6 to FIG. 15.

All or some of the foregoing embodiments of the present subject matter may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of the present subject matter are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely example implementations of the present subject matter, but are not intended to limit the protection scope of the present subject matter. Any variation or replacement readily figured out by a person skilled in the art within the technical scope disclosed in the present subject matter shall fall within the protection scope of the present subject matter. Therefore, the protection scope of the present subject matter shall be subject to the protection scope of the claims.

The invention claimed is:

1. An apparatus comprising:
 a first bundle comprising a first profile and a first operating system, wherein the first profile has a first profile identifier that uniquely identifies the first profile, wherein the first profile corresponds to a first operator and a first profile policy rule (PPR), and wherein the first profile is enabled;
 a second bundle comprising a second profile and a second operating system, wherein the second profile has a second profile identifier that uniquely identifies the second profile, wherein the second profile corresponds to a second operator and a second PPR, wherein the second profile is not enabled; and
 a processor configured to:
  receive, from a local profile assistant (LPA), a first message comprising the second profile identifier and a profile enabling command for enabling the second profile;
  obtain the first PPR from the first profile;
  perform a first operation according to the first PPR;
  receive, from the LPA, a second message comprising a memory reset command;
  send, to the first operating system and based on the second message, a third message; and
  send, to the second operating system and based on the second message, a fourth message,
  wherein the third message and the fourth message indicate to delete an operational profile.

2. The apparatus of claim 1, wherein the processor is further configured to:
 send, to the first operating system, a fifth message for obtaining the first PPR, wherein the fifth message comprises the first profile identifier; and
 receive, from the first operating system, the first PPR.

3. The apparatus of claim 1, wherein the processor is further configured to send an error message to the LPA when the first profile is not allowed to be disabled according to the first PPR.

4. The apparatus of claim 1, wherein the processor is further configured to send, to the LPA, a sixth message instructing to send the first message to the apparatus when the LPA receives an operation instruction from a user.

5. The apparatus of claim 1, wherein the apparatus further comprises an embedded universal integrated circuit card (eUICC), and wherein the processor comprises an issuer security domain-root (ISD-R).

6. The apparatus of claim 1, wherein the first profile identifier comprises a first integrated circuit card identifier (ICCID), and wherein the second profile identifier comprises a second ICCID.

7. The apparatus of claim 1, wherein the apparatus is configured to download and install the first bundle and the second bundle, and wherein the processor is further configured to update a profile list based on the first bundle or the second bundle.

8. A device comprising:
 a memory configured to store a local profile assistant (LPA); and
 an embedded universal integrated circuit card (eUICC) coupled to the memory and comprising:
  a first bundle comprising a first profile and a first operating system, wherein the first profile has a first profile identifier that uniquely identifies the first profile, wherein the first profile corresponds to a first operator and a first profile policy rule (PPR), and wherein the first profile is enabled;
  a second bundle comprising a second profile and a second operating system, wherein the second profile has a second profile identifier that uniquely identifies the second profile, wherein the second profile corresponds to a second operator and a second PPR, and wherein the second profile is not enabled; and
  a processor configured to:
   receive, from the LPA, a first message comprising the second profile identifier and a profile enabling command for enabling the second profile;
   obtain, from the first profile, the first PPR;
   perform a first operation according to the first PPR;
   receive, from the LPA, a second message comprising a memory reset command;

send, to the first operating system and based on the second message, a third message; and send, to the second operating system and based on the second message, a fourth message, wherein the third message and the fourth message indicate to delete an operational profile.

9. The device of claim 8, wherein the processor is further configured to:

send, to the first operating system, a fifth message for obtaining the first PPR, wherein the fifth message comprises the first profile identifier; and receive, from the first operating system, the first PPR.

10. The device of claim 8, wherein the processor is further configured to an error message to the LPA when the first profile is not allowed to be disabled according to the first PPR.

11. The device of claim 8, wherein the processor is further configured to send, to the LPA, a sixth message instructing to send the first message to the apparatus when the LPA receives an operation instruction from a user.

12. The device of claim 8, wherein the processor comprises an issuer security domain-root (ISD-R).

13. The device of claim 8, wherein the first profile identifier comprises a first integrated circuit card identifier (ICCID), and wherein the second profile identifier comprises a second ICCID.

14. The device of claim 8, wherein the eUICC is configured to download and install the first bundle and the second bundle, and wherein the processor is further configured to update a profile list based on the first bundle or the second bundle.

15. An apparatus comprising:

a first bundle comprising a first profile and a first operating system, wherein the first profile has a first profile identifier that uniquely identifies the first profile, wherein the first profile corresponds to a first operator, and wherein the first profile is enabled;

a second bundle comprising a second profile and a second operating system, wherein the second profile has a second profile identifier that uniquely identifies the second profile, wherein the second profile corresponds to a second operator, and the second profile is not enabled; and a processor configured to:

receive, from a local profile assistant (LPA), a first message comprising the second profile identifier and a profile enabling command for enabling the second profile;

perform a first operation according to the first message;

receive, from the LPA, a second message comprising a memory reset command;

send, to the first operating system and based on the second message, a third message; and send, to the second operating system and based on the second message, a fourth message, wherein the third message and the fourth message indicate to delete an operational profile.

16. The apparatus of claim 15, wherein the processor is further configured to send, to the LPA, a fifth message instructing the LPA to send the first message to the apparatus when the LPA receives an operation instruction from a user.

17. The apparatus of claim 15, wherein the apparatus further comprises an embedded universal integrated circuit card (eUICC), and wherein the processor comprises an issuer security domain-root (ISD-R).

18. The apparatus of claim 15, wherein the processor is further configured to send an error message to the LPA when the first profile is not allowed to be disabled according to the first PPR.

19. The apparatus of claim 15, wherein the first profile identifier comprises a first integrated circuit card identifier (ICCID), and wherein the second profile identifier comprises a second ICCID.

20. The apparatus of claim 15, wherein the apparatus is configured to download and install the first bundle and the second bundle, and wherein the processor is further configured to update a profile list based on the first bundle or the second bundle.

* * * * *

UNITED STATES PATENT AND TRADEMARK OFFICE
CERTIFICATE OF CORRECTION

| | | |
|---|---|---|
| PATENT NO. | : 12,041,456 B2 | Page 1 of 1 |
| APPLICATION NO. | : 17/973088 | |
| DATED | : July 16, 2024 | |
| INVENTOR(S) | : Xiaobo Yu and Shunan Fan | |

It is certified that error appears in the above-identified patent and that said Letters Patent is hereby corrected as shown below:

On the Title Page

Page 2, (56) References Cited, Foreign Patent Documents: "IN 106648725 A 5/2017" should read "CN 106648725 A 5/2017"

Signed and Sealed this
Twenty-fourth Day of June, 2025

Coke Morgan Stewart
*Acting Director of the United States Patent and Trademark Office*